United States Patent
Hidaka

(12)
(10) Patent No.: US 6,260,641 B1
(45) Date of Patent: Jul. 17, 2001

(54) STEERING MECHANISM OF DRIVING TRANSMISSION

(75) Inventor: Shigemi Hidaka, Osaka (JP)

(73) Assignee: Yanmar Agricultural Equipment Co., Ltd., Osaka (JP)

( * ) Notice: Subject to any disclaimer, the term of this patent is extended or adjusted under 35 U.S.C. 154(b) by 0 days.

(21) Appl. No.: 09/269,025

(22) PCT Filed: Jun. 9, 1997

(86) PCT No.: PCT/JP97/01995

§ 371 Date: Mar. 18, 1999

§ 102(e) Date: Mar. 18, 1999

(87) PCT Pub. No.: WO98/12098

PCT Pub. Date: Mar. 26, 1999

(30) Foreign Application Priority Data

Sep. 20, 1996 (JP) .................................................... 8-250538

(51) Int. Cl.[7] .................................................. B62D 11/06
(52) U.S. Cl. ............................................................ 180/6.44
(58) Field of Search ................................... 180/6.44, 6.2, 180/6.62, 6.66, 6.7

(56) References Cited

U.S. PATENT DOCUMENTS

| | | | | |
|---|---|---|---|---|
| 4,174,762 | * | 11/1979 | Hopkins et al. ..................... | 180/6.44 |
| 4,420,991 | * | 12/1983 | Meyerle ................................ | 475/23 |
| 4,600,068 | * | 7/1986 | Lenhard-Backhaus ............. | 180/6.44 |
| 4,882,947 | * | 11/1989 | Barnard ................................ | 475/23 |
| 5,477,455 | * | 12/1995 | Ishino et al. ........................ | 701/50 |

FOREIGN PATENT DOCUMENTS

| | | |
|---|---|---|
| 53-18135 | 2/1978 | (JP) . |
| 5-301580 | 11/1993 | (JP) . |
| 7-76285 | 3/1995 | (JP) . |
| 7-329818 | 12/1995 | (JP) . |
| 8-142906 | 6/1996 | (JP) . |
| 8-156821 | 6/1996 | (JP) . |
| 8-310434 | 11/1996 | (JP) . |

* cited by examiner

*Primary Examiner*—Kevin Hurley
(74) *Attorney, Agent, or Firm*—Sterne, Kessler, Goldstein & Fox PLLC

(57) ABSTRACT

In an operation mechanism of an HST system transmission apparatus of the type in which an HST system non-stage transmission mechanism for driving and an HST system non-stage transmission mechanism for turning are disposed, the HST system non-stage transmission mechanism is operated by a transmission lever and the HST system non-stage transmission mechanism for turning is operated by a round operation wheel, a steering mechanism can make a turning operation matching turn feeling desired by an operator in turning at both low and high speeds. Namely, in the operation of the HST system transmission apparatus wherein the HST system non-stage transmission mechanism (25) for driving is operated by a transmission lever (68) and the HST system non-stage transmission mechanism (28) for turning is operated by a round operation wheel (19), a speed ratio between right and let driving devices is changed in accordance with the operation turning angle of the round operation wheel (19). The turning radius is changed, even with the same operation turning angle of the round operation wheel (19), by the difference of the operation angle of the transmission lever (68).

8 Claims, 30 Drawing Sheets

STEERING MECHANISM OF DRIVING TRANSMISSION

TECHNICAL FIELD

The present invention relates to an operation mechanism of a hydrostatic transmission (hereinafter abbreviated as "HST") type transmission apparatus applied to a crawler type working vehicle, wherein the apparatus has a driving HST constituting a non-stage transmission mechanism for speed changing and a steering HST constituting a non-stage transmission mechanism for turning.

BACKGROUND ART

Conventionally, it is well-known that a crawler type working vehicle is driven by use of an HST type non-stage transmission mechanism (as described in Japanese Utility Model Laid Open Gazette No. Sho 60-89,454). However, there has been no HST type transmission apparatus having an HST type non-stage mechanism for driving and an HST type mechanism for steering.

SUMMARY OF THE INVENTION

A transmission apparatus M of the present invention is so constructed that a steering HST mechanism 28 constituting a non-stage transmission mechanism for turning is juxtaposed with a driving HST mechanism 25 constituting a non-stage transmission mechanism for driving, the driving HST mechanism 25 being operated by a speed changing lever 68, and the steering HST mechanism 28 being operated by a round steering wheel 19. The rate of operational slanting angle of the speed changing lever 68 coincides with the rate of rotary speed of the steering HST mechanism 28 when the operated steering wheel 19 reaches its stroke end, thereby improving the operation feeling of the steering wheel 19 during the extreme low speed driving.

A speed changing servo rod 111, which is operated by the operation of the speed changing lever 68, is connected with a speed changing operation arm 151 of the driving HST mechanism 25. The connecting portion between the speed changing servo rod 111 and the speed changing operation arm 151 has a clearance so that the arm 151 does not start rotating or the vehicle does not advance until the speed changing lever 68 is operated to a certain degree, thereby increasing the rotational angle of the speed changing lever 68 for the extreme low speed driving, whereby a rotational angle of a steering operation arm 162, when the operated steering wheel 19 reaches its stroke end, is increased.

The operation mechanism including the speed changing lever 68 and the steering wheel 19 for the HST type transmission apparatus having the juxtaposed driving and steering HST mechanisms 25 and 28 according to the present invention, wherein the driving HST mechanism 25 is operated by the speed changing lever 68 and the steering HST mechanism 28 is operated by the steering wheel 19, has effects as follows:

Firstly, due to the construction that the ratio of speed between left and right driving devices is changed by change of rotational angle of the steering wheel 19, as the rotational angle of the steering wheel 19 for turning is increased, the difference of speed between left and right driving crawlers 2 is gradually increased, so that the turning radius is reduced, thereby making the turning angle agree with the feeling of an operator.

Secondly, while the rotational angle of the steering wheel 19 is the same, the turning angle is changed according to the change of operation angle of the speed changing lever 68, so that the vehicle turns on a small circle slowly and on a large circle fast. If the vehicle turned on a common circle either slowly or fast when the steering wheel 19 was operated at the same angle, the vehicle might roll sideways when turning at high speed. According to the present invention, this problem can be prevented.

Thirdly, even though the left and right driving devices are of a crawler type, the vehicle can spin or turn on an extreme small circle easily by use of the firstly and secondly mentioned operation mechanism for a transmission apparatus.

Fourthly, the firstly and secondly mentioned operation mechanism for a transmission apparatus is further constructed so that, when the steering wheel 19 is operated for turning while the speed level determined by the speed changing lever 68 is low, as the operation angle of the steering wheel 19 is increased, the driving device on the turning side is gradually decelerated and the driving device on the opposite side gradually accelerated, and while the speed level is high, the opposite side driving device is also decelerated gradually, however, the rate of speed reduction of the turning side driving means is larger than the other. Hence, the vehicle can naturally turn with the most comfortableness for the operator mainly by deceleration of the turning side without acceleration of the opposite side.

Fifthly, the fourthly mentioned steering mechanism of a transmission apparatus is further constructed so that, when the rotational angle of the steering wheel 19 is small, the speed reducing rate of the decelerated side is small and the speed increasing rate of the accelerated side is large, and when the angle is large, the relation of scale between the speed reducing rate of the decelerated side and the speed increasing rate of the accelerated side is inverse. Hence, even the case of a large circular turning or that the operation angle of the steering wheel 19 is small, a natural steering operation can be obtained.

Sixthly, the fourthly mentioned steering mechanism of a transmission apparatus is further constructed so that, when the speed level determined by the speed changing lever 68 is low, both the turning and opposite sides are gradually decelerated, however, the opposite side is accelerated once, and then is gradually decelerated. Hence, when fast driving, the vehicle can be prevented from rapid turning, so that it can turn naturally whether the case is a large circular turning or a small circular turning.

BEST MODE FOR PRACTICING THE INVENTION

Figure 1:
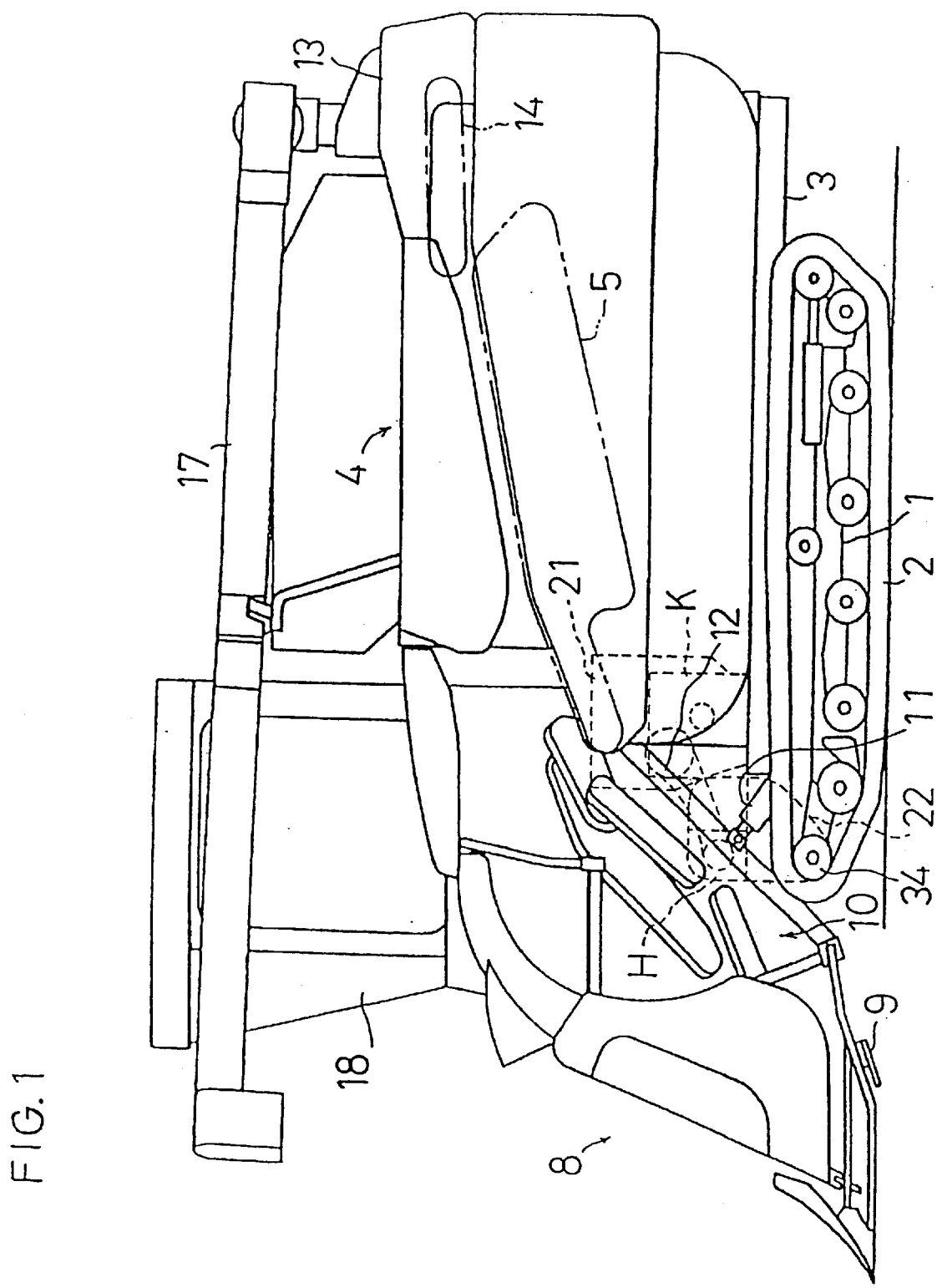
FIG. 1 is an entire side view of a combine as one of crawler type working vehicles employing an HST type transmission apparatus according to the present invention.
Figure 2:
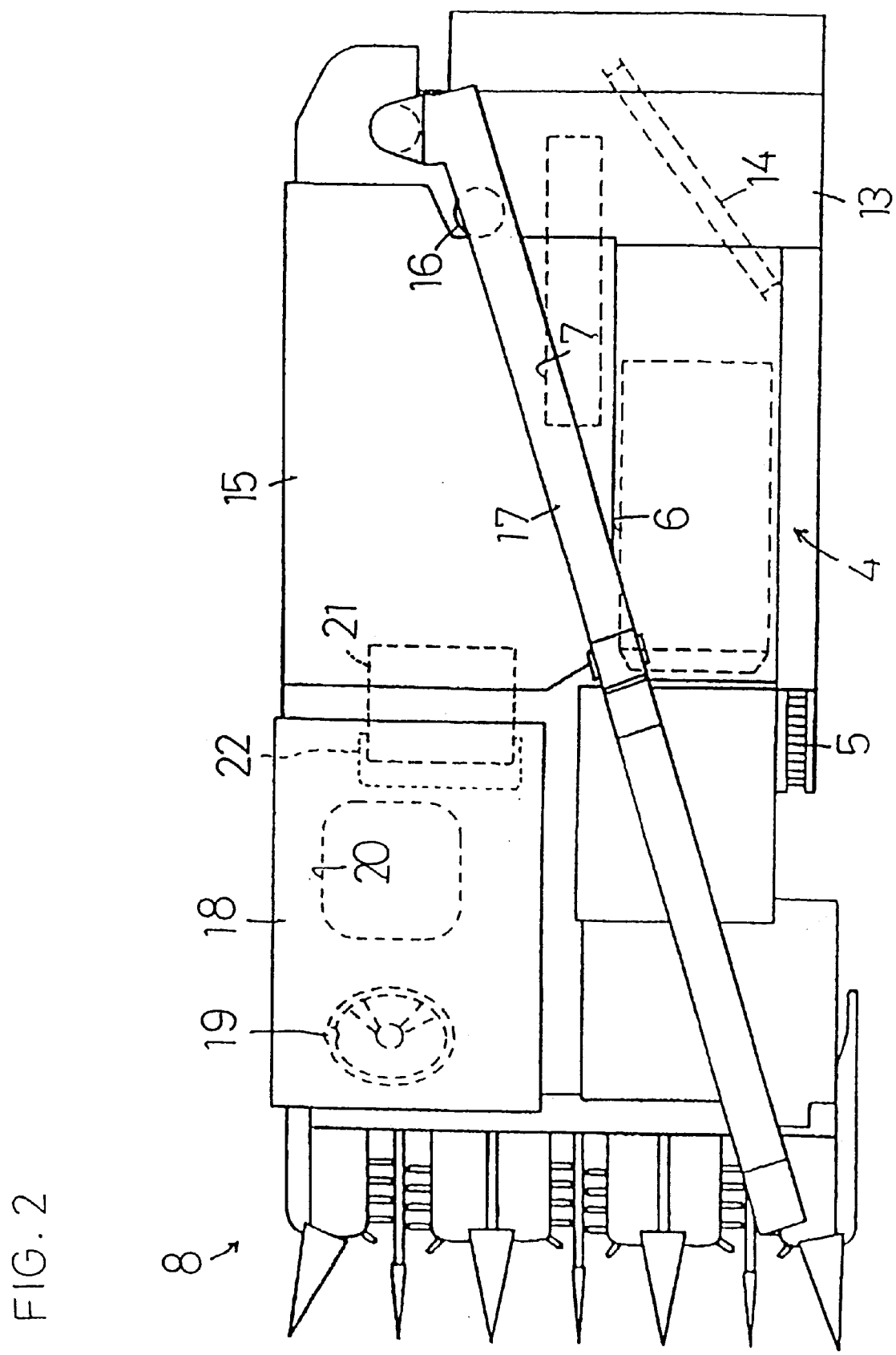
FIG. 2 is a plan view of the same shown in FIG. 1.

Detailed explanation will be given on the embodiments of the present invention based on the drawings as follows:

Referring to a combine having a transmission apparatus M of the present invention shown in FIGS. 1 and 2, driving crawlers 2 are provided on a track frame 1. A body frame 3 is spread over the track frame 1. A threshing unit 4 is provided on the left side thereof with a feed chain 5 and provided therein with a threshing cylinder 6 and a second threshing cylinder 7. A reaping unit 8 is provided with a reaping blade 9 and a cereal conveying mechanism 10. The reaping unit 8 is vertically movable by operation of a hydraulic cylinder 11 through a reaping unit frame 12.

A waste straw conveying chain 14 is extended so that the end thereof faces a waste straw treating unit 13. Grains from the threshing unit 4 are conveyed into a grain tank 15 through a vertical grain auger 16 and are discharged outwardly from the grain tank 15 through a discharge auger. An operator's cab 18 is provided therein with a steering wheel 19, an operator's seat 20 and so on. An engine 21 is disposed below the operator's cab 18. The combine can continuously reap and thresh cereals by such construction thereof.

Explanation will be given on a construction of the transmission apparatus M shown in FIG. 3.

A transmission apparatus M for driving crawlers 2 consists of a mechanical transmission casing 22 and an HST device H mounted on the transmission casing 22.

The HST device H is provided with a driving HST type non-stage transmission mechanism 25 serving as a main speed changing mechanism including a pair of a driving hydraulic pump 23 and a driving hydraulic motor 24, and with a steering HST type non-stage transmission mechanism 28 including a pair of a steering hydraulic pump 26 and a steering hydraulic motor 27.

An input shaft 23a of the driving hydraulic pump 23 interlocks with an output shaft 21a of the engine 21 through a counter casing K, a transmission belt 29 and so on, and with an input shaft 26a of the steering pump 26 through a transmission belt 30. The transmission belt 30 is replaced with a coupling 143 in the later discussed embodiment shown in FIG. 9.

An output shaft 31 is drivingly connected with driving wheels 34 for driving crawlers 2 through a sub speed changing mechanism 32 and a differential gearing 33 in the transmission casing 22.

The differential gearing 33 is provided with a pair of laterally symmetrical planetary gear trains 35. Each planetary gear train 35 comprises a sun gear 36, three planet gears 37 engaging with the periphery of the sun gear 36, a ring gear 38 engaging with the planet gears 37, and the like.

Carrier shafts 40 are extended co-axially with a sun gear shaft 39. The planet gears 37 are rotatably supported on carriers 41 of carrier shafts 40, respectively, so that the carriers 41 face each other with the left and right sun gears 36 between. The ring gear 38 having inner peripheral gear for engaging with the planet gears 37 is rotatably supported on each carrier shaft 40 so as to be disposed co-axially with the sun gear shaft 39.

The driving HST mechanism 25 in the HST device H controls the reversible rotational direction and speed of the driving hydraulic motor 24 by adjusting the angle of the movable swash plate of the driving hydraulic pump 23. The rotary of the output shaft 31 by the output of the driving hydraulic motor 24 is transmitted to a center gear 46 fixed on the sun gear shaft 39 through the transmission gears 42, 43, 44 and 45 and the sub speed changing mechanism 32 in the transmission casing 22, thereby driving the sun gears 36.

The sub speed changing mechanism 32 is provided with a sub transmission shaft 47 having the gear 45 and a speed sensor shaft 49 having a gear 48 engaging with the center gear 46. A pair of low speed gears 50 and 48, a pair of mid speed gears 51 and 52, and a pair of high speed gears 53 and 54 are interposed between the sub transmission shaft 47 and the speed sensor shaft 49. The slide operation of the middle positioned low speed gear 51 enables one of gear trains for low, mid and high speeds to be chosen.

On the speed sensor shaft 49 are a speed detecting gear 55 and a speed sensor 56 which detects the rotary speed of the gear 55 for detection of the speed of the driving vehicle. The output shaft 31 interlocks with a PTO input gear 58 of a PTO shaft 57 for power transmission to a working device or the like through a PTO transmission mechanism 59.

The driving power of the sun gear shaft 39, which is transmitted from the driving hydraulic motor 24 through the center gear 46, is further transmitted to the carrier shafts 40 through the left and right planetary gear trains 35. Left and right pairs of speed reduction gears 60 and 61 transmit the rotary power from the carrier shafts 40 to left and right axles 34a having the left and right driving wheels 34, respectively.

The steering HST mechanism 28 in the HST device H controls the reversible rotational direction and speed of the steering hydraulic motor 27 by adjusting the angle of the movable swash plate of the steering hydraulic pump 26. The rotary power is transmitted from an output gear of the output shaft 62 of the steering hydraulic motor 27 to the input gears 65a and 65b on a steering input shaft 64 through a gear train 63 in the transmission casing 22. The input gear 65a directly engages with the outer peripheral gear of the left ring gear 38. The input gear 65b engages with the outer peripheral gear of the right ring gear 38 through a reversing gear 67, so that, during the normal rotation of the steering hydraulic motor 27, the left and right ring gears 38 are rotated at the same speed while the left ring gear 38 is normally rotated and the right ring gear 38 inversely.

When the steering hydraulic pump 26 is set off so as to make the left and right ring gears 38 fixedly stay and the driving hydraulic pump 23 is driven, the rotary power of the driving hydraulic motor 24 is transmitted to the center gear 46 so as to rotate the left and right sun gears 36 at the same speed, and further transmitted to the left and right axles 34a through the planet gears 37, the carriers 41 and the speed reduction gears 60 and 61 of the left and right planetary gear trains 35, respectively, so that the left and right axles 34a are rotated in the same direction and at the same speed, thereby driving the vehicle in either of advancing and reversing straight directions.

When the driving hydraulic pump 23 is set off so as to make the left and right sun gears 36 fixedly stay and the steering hydraulic pump 26 is driven, the left planetary gear train 35 is normally or inversely rotated while the right planetary gear train 35 is oppositely rotated, so that the left and right crawlers 2 are either forwardly or rearwardly driven in opposite directions to each other, whereby the vehicle spins on its place leftwardly or rightwardly. Rotary power of the driving hydraulic motor 24 is transmitted to the center gear 46 so as to rotate the left and right sun gears 36 at the same speed, and further transmitted to the left and right axles 34a through the planet gears 37, the carriers 41 and the speed reduction gears 60 and 61 of the left and right planetary gear trains 35, respectively, so that the left and right axles 34a are rotated in the same direction and at the same speed, thereby driving the vehicle in either of advancing and reversing straight directions.

The the driving hydraulic pump 23 is driven during the fixedly staying of the left and right ring gears 38 by the rotation of the of the output shaft 62 by the output of the driving hydraulic motor 24 is transmitted to a center gear 46 fixed on the sun gear shaft 39 through the transmission gears 42, 43, 44 and 45 and the sub driving transmission 32 in the transmission casing 22, thereby driving the sun gear 36.

The sub driving transmission 32 is provided with a sub transmission shaft 47 having the gear 45 and a speed sensor shaft 49 having a gear 48 engaging with the center gear 46. A pair of low speed gears 50 and 48, a pair of mid speed gears 51 and 52, and a pair of high speed gears 53 and 54 are interposed between the sub transmission shaft 47 and the speed sensor shaft 49. The slide operation of the middle located low speed gear 51 enables one of gear trains for low, mid and high speeds to be chosen.

On the speed sensor shaft 49 are a speed detecting gear 55 and a speed sensor 56 which detects the rotary speed of the gear 55 for detection of the speed of the driving vehicle. The output shaft 31 interlocks with a PTO input gear 58 of a PTO shaft 57 for transmission to a working device or the like through a PTO transmission mechanism 59.

The driving power of the sun gear shaft 39, which is transmitted from the driving hydraulic motor 24 through the center gear 46, is further transmitted to the carrier shafts 40 through the left and right planetary gear trains 35. Left and right pairs of speed reduction gears 60 and 61 transmit the rotary power from the carrier shafts 40 to left and right axles 34a having the left and right driving wheels 34, respectively.

The simultaneous driving of he driving hydraulic pump 23 and the steering hydraulic pump 26 enables the vehicle to turn left or right on various sized circle, whose radius is determined according to the speed of the left and right driving crawlers 2.

Figure 3:
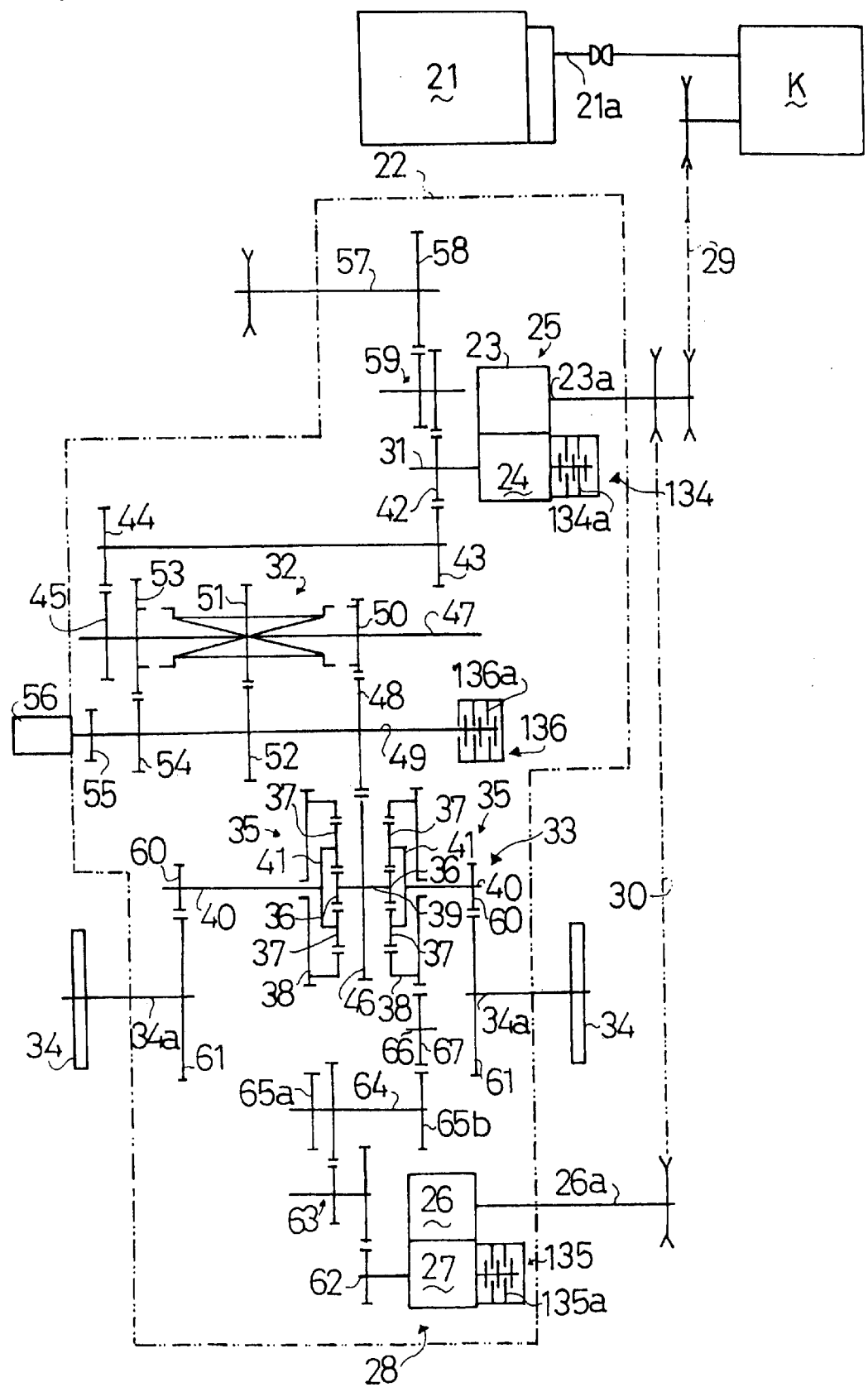
FIG. 3 is a schematic diagram of a transmission apparatus M of the same combine consisting of a HST device H and a mechanical transmission casing 22 combined with each other.

As shown in FIG. 3, a neutral braking device 135 including a wet multi-disk system 135a is provided on the other end of the output shaft 62 of the steering hydraulic motor 27.

Also, a neutral braking device 134 including a wet multi-disk system 134a is provided on the other end of the output shaft 31 of the driving hydraulic motor 24.

Next, explanation will be given on the transmission apparatus M and the HST device H in accordance with FIGS. 4 through 11.

Figure 4:
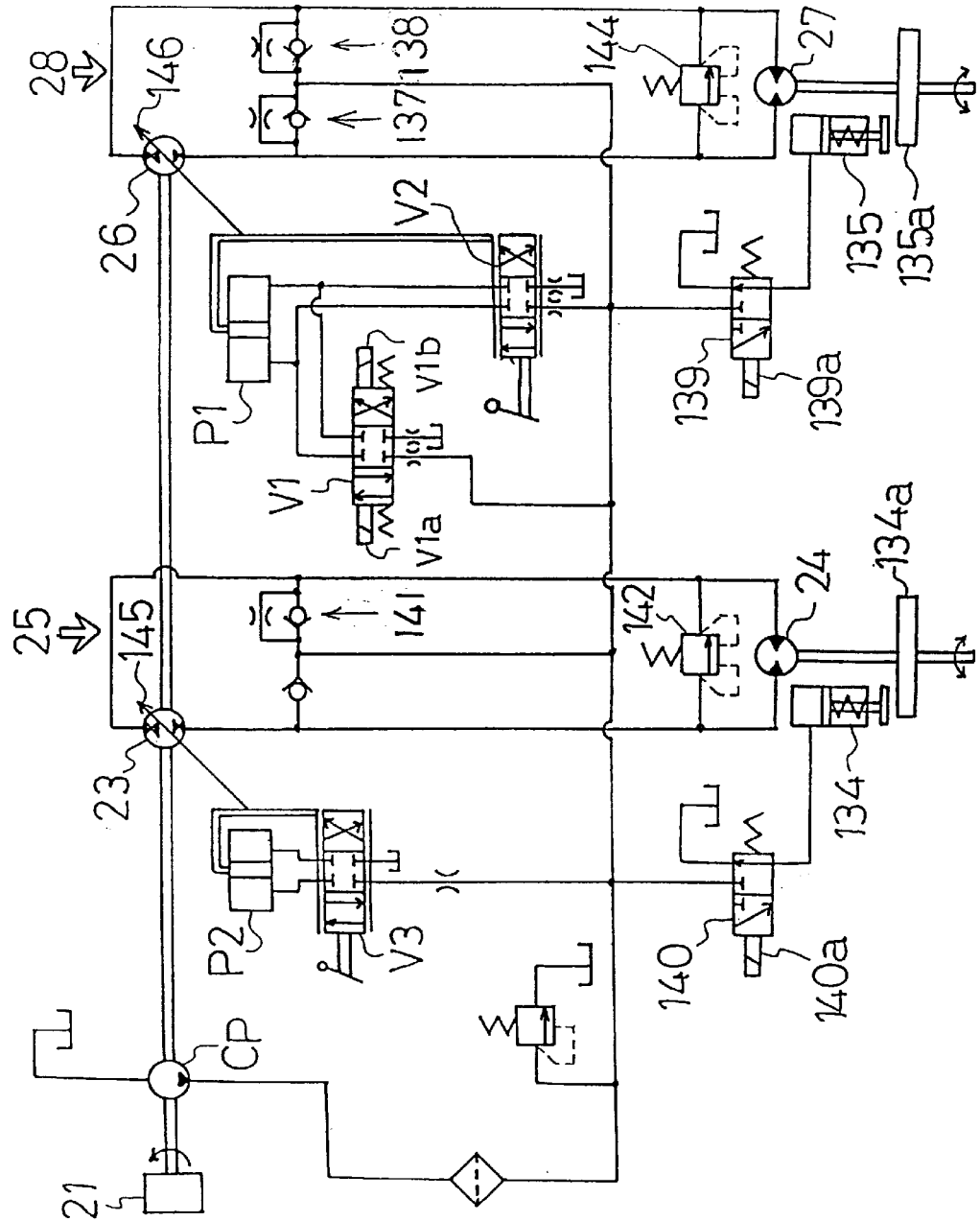
FIG. 4 is a hydraulic circuit diagram of the HST type transmission device H.
Figure 5:
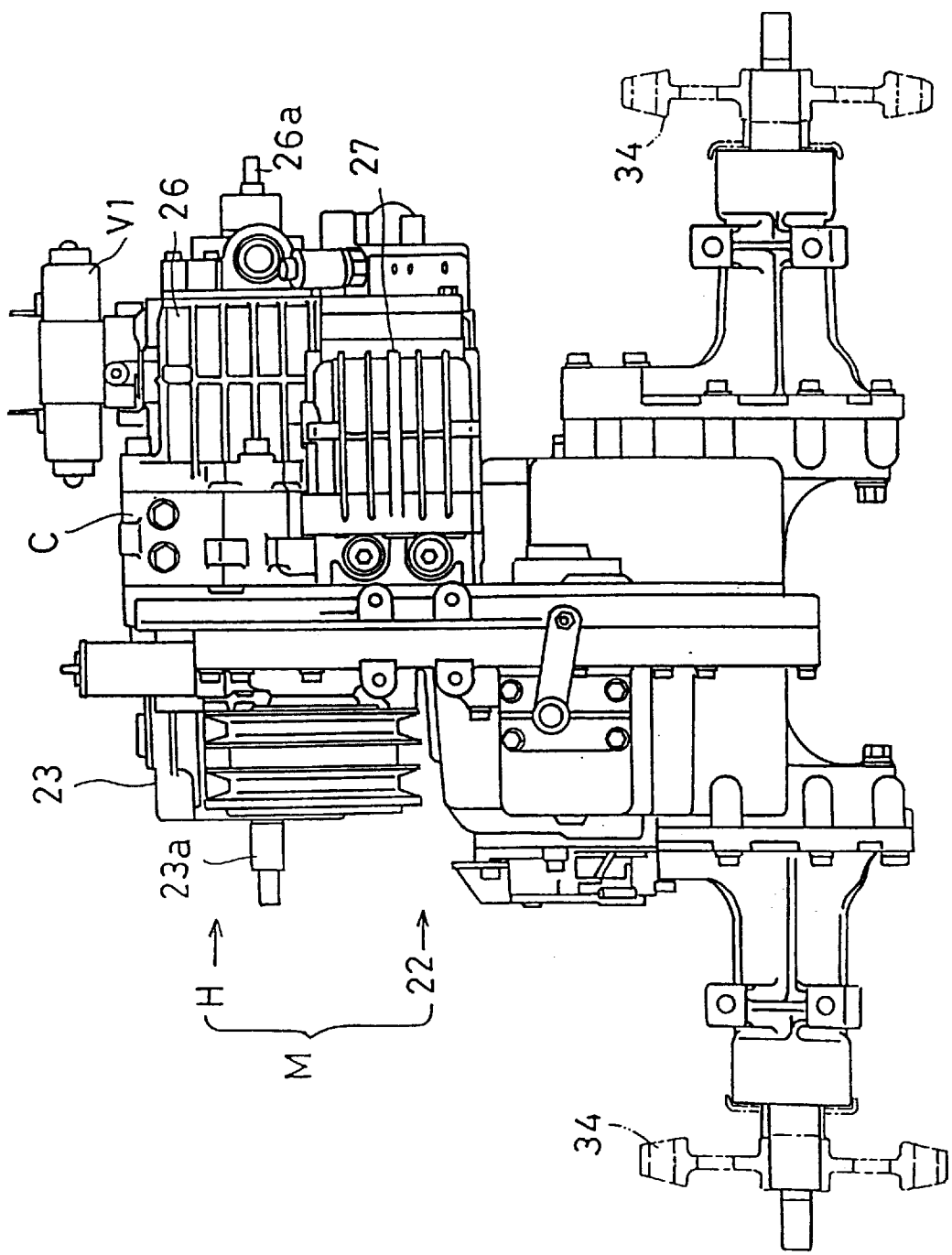
FIG. 5 is a rear view of the transmission apparatus M consisting of the transmission casing 22 and the HST device H mounted on the transmission casing 22.
Figure 6:
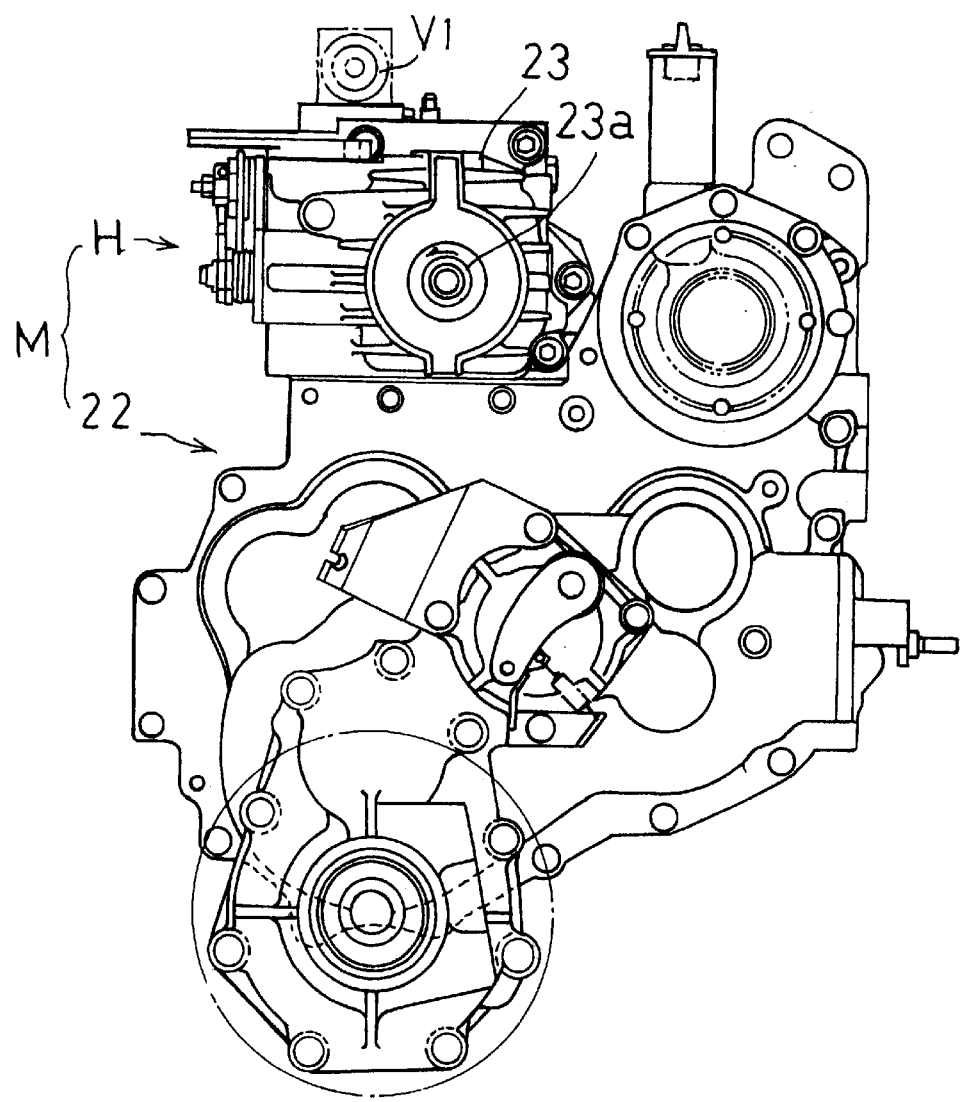
FIG. 6 is a right side view of the transmission apparatus M.
Figure 7:
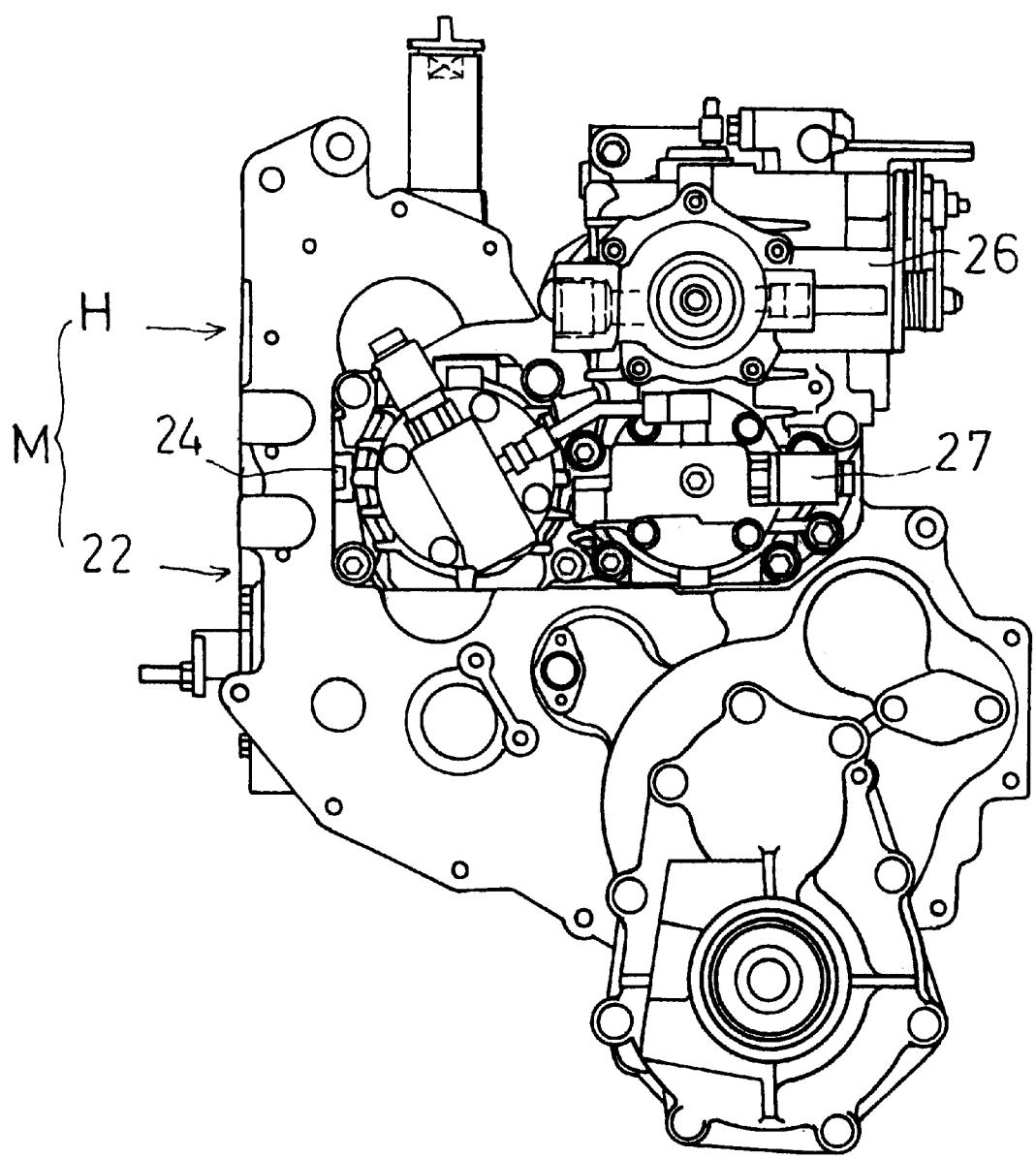
FIG. 7 is a left side view of the transmission apparatus M.

Firstly, the hydraulic circuit of the HST device according to the present invention will be described as shown in FIG. 4 and others. The HST device H comprises the driving HST mechanism 25, the steering HST mechanism 28, a charge pump CP, the neutral braking devices devices 134 and 135, and so on, which are mounted on the front and rear surfaces of a center section C.

Figure 9:
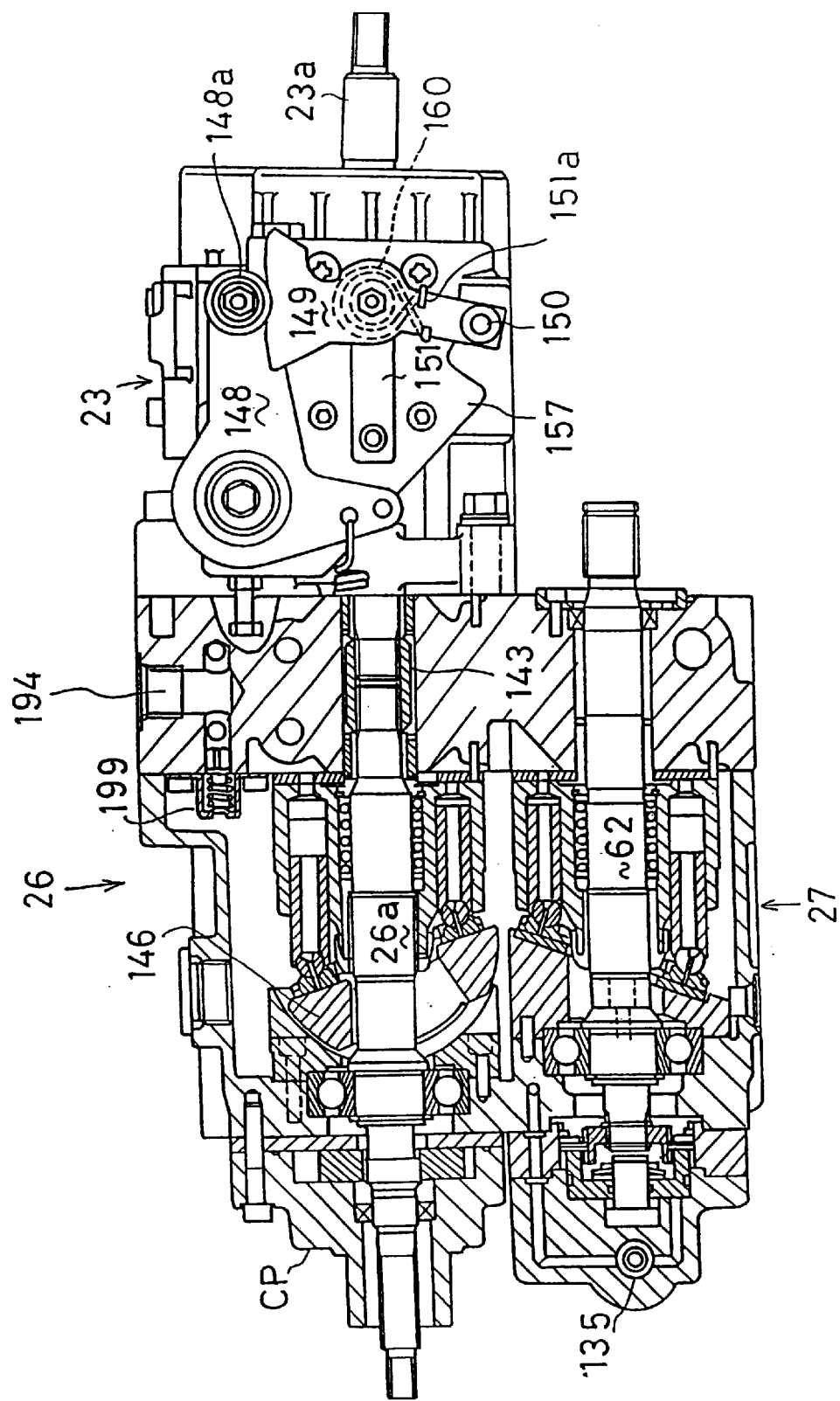
FIG. 9 is a partly sectional front view of the same.

As shown in FIG. 9, the input shaft 23a of the driving hydraulic pump 23 joins the input shaft 26a of the steering hydraulic pump 26 through the coupling 143. The charge pump CP is drivingly mounted on the input shaft 26a. The coupling 143 of this embodiment replaces the transmission belt 30 shown in FIG. 3.

The charge pump CP supplies both the closed fluid circuits of the driving HST mechanism 25 and the steering HST mechanism 28 with operating oil. Both passages toward both supply ports of the closed fluid circuit of the steering HST mechanism 28 is provided with check valve and orifice units 137 and 138, respectively. One passage toward one supply port of the closed fluid circuit of the driving HST mechanism 25 is provided with a check valve and orifice unit 141.

A bypass circuit of the closed fluid circuit of the driving HST mechanism 25 is provided with a hydraulic pressure regulation valve 142 and that of the steering HST mechanism 28 with a hydraulic pressure regulation valve 144.

Referring to a driving servomechanism T1 for operating the slanting of a swash plate 145 of the driving hydraulic pump 23 constituting the driving HST mechanism 25, a piston P1 and a spool S1 are operated by only a manual speed changing control valve V3. Referring to a steering servomechanism T2 for operating the slanting of a swash plate 146 of the steering hydraulic pump 26 constituting the steering HST mechanism 28, pistons P1 and P2 and spools S1 and S2 are operated by both an automatic steering control valve V1 and a manual steering control valve V2.

As shown in FIG. 4, a part of operating oil from the charge pump CP is introduced into a driving neutral braking electromagnetic valve 140 and a steering neutral braking electromagnetic valve 139, thereby braking the neutral braking device 134 of the driving hydraulic motor 24 and the neutral braking device 135 of the steering hydraulic motor 27, respectively.

The neutral braking electromagnetic valves 140 and 139 are fluidly connected through a piping into which the pressure oil from the charge pump CP is introduced.

The double pump and motor type HST device H, which is provided with the driving HST mechanism 25 and the steering HST mechanism 28 centering the center section C, is mounted on the upper portion of the transmission casing 22 comprising the sub speed changing mechanism 32, the planetary gear trains 35 and the like.

Both the output shaft 31 of the driving hydraulic pump 23 and the output shaft 62 of the steering hydraulic motor 62 pass through the center section C so as to project from the side thereof on which the driving hydraulic pump 23 is mounted.

The output shaft 31 of the driving hydraulic pump 23 is inserted into the transmission casing 22 so as to drive the speed changing mechanism therein. The output shaft 62 of the steering hydraulic motor 27 is also inserted into the transmission casing 22 so as to drive the pair of lateral symmetrical planetary gear trains 35 therein, so that the crawler type driving means can be steered by the steering wheel 19.

Figure 8:
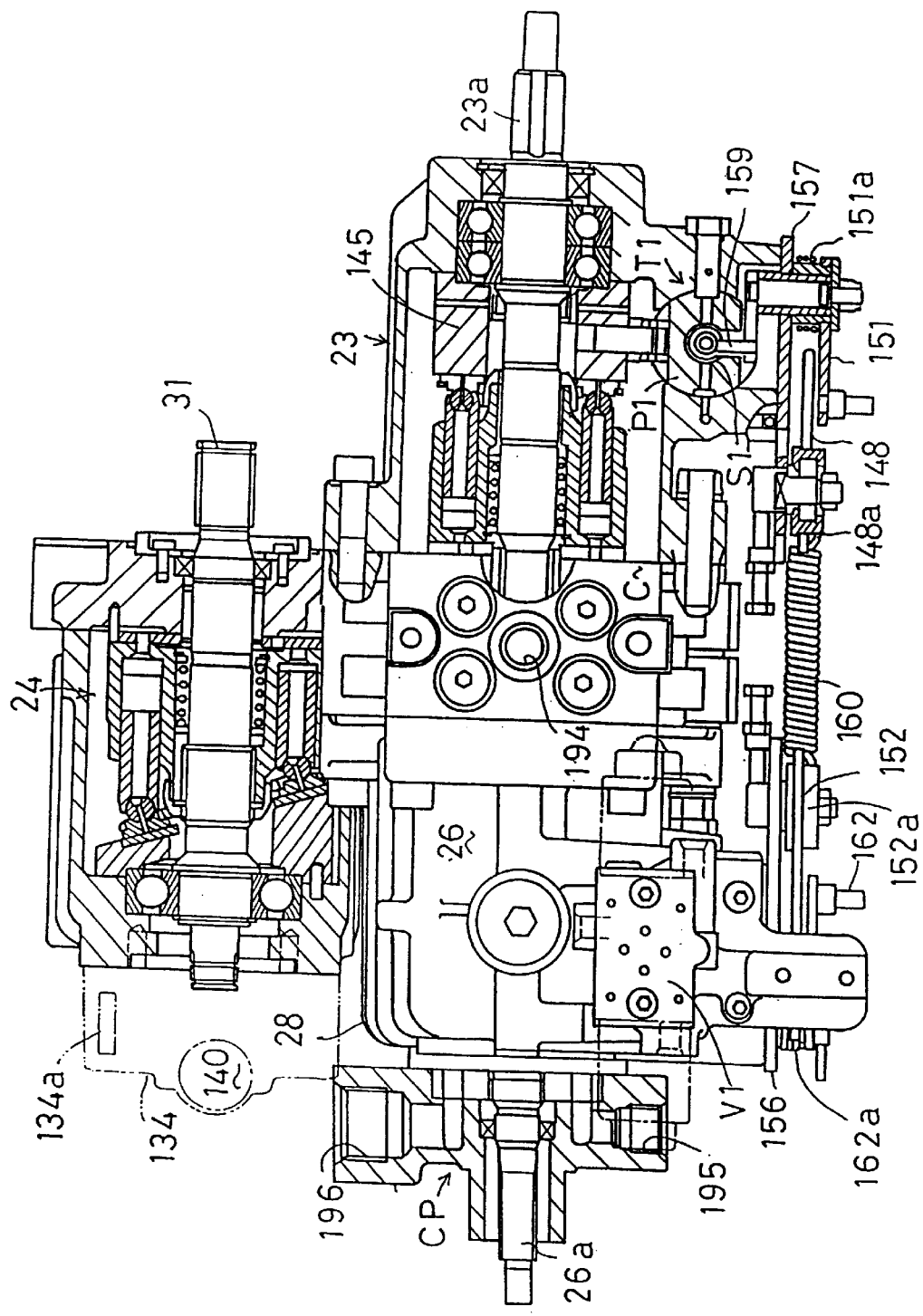
FIG. 8 is a partly sectional plan view of the HST device H.

As shown in FIGS. 8 through 11, the driving hydraulic pump 23 as a half of the driving HST mechanism 25 on the right side of the center section C. When viewed in front as shown in FIG. 8, the driving hydraulic motor 24 as the other half of the driving HST mechanism 25 and the output shaft 31 are disposed beside the input shaft 23a.

The output side of the output shaft 31 laterally projects through the center section C so as to be inserted into the transmission casing 22, thereby driving the sub speed changing mechanism 32 and the differential gearing 33. On the other end of the output shaft 31 in opposite to the center section C is disposed the neutral braking device 134, the wet multi-disc system 134a and the driving neutral braking electromagnetic valve 140.

On the left side of the center section C in opposite to the driving hydraulic pump 23 is disposed the steering hydraulic pump 26 constituting the steering HST mechanism 28. The input shaft 23a of the driving hydraulic pump 23 and the input shaft 26a of the steering hydraulic pump 26 are connected with each other through the spline of the coupling 143, thereby being integrally rotated by the power transmitted from the engine 21. For this embodiment, the coupling 143 replaces the transmission belt 30 shown in FIG. 3.

The driving power from the output shaft 21a of the engine 21 is transmitted to the input shaft 23a through the transmission belt 29.

On the other end of the input shaft 26a driven through the coupling 143 is provided the charge pump CP, and an additional PTO pulley, fixedly.

The automatic steering control valve V1 is mounted on the upper surface of the steering hydraulic pump 26. A combination of the automatic steering control valve V1, the manual steering control valve V2 in a piston P2, and the piston P1 entirely constitutes the steering servomechanism T2. Near the driving hydraulic pump 23 is disposed the driving servomechanism T1 constituted by the manual speed changing control valve V3, a spool S3 and the piston P2.

Next, explanation will be given on the construction of the driving servomechanism T1 and the steering servomechanism T2.

Figure 10:
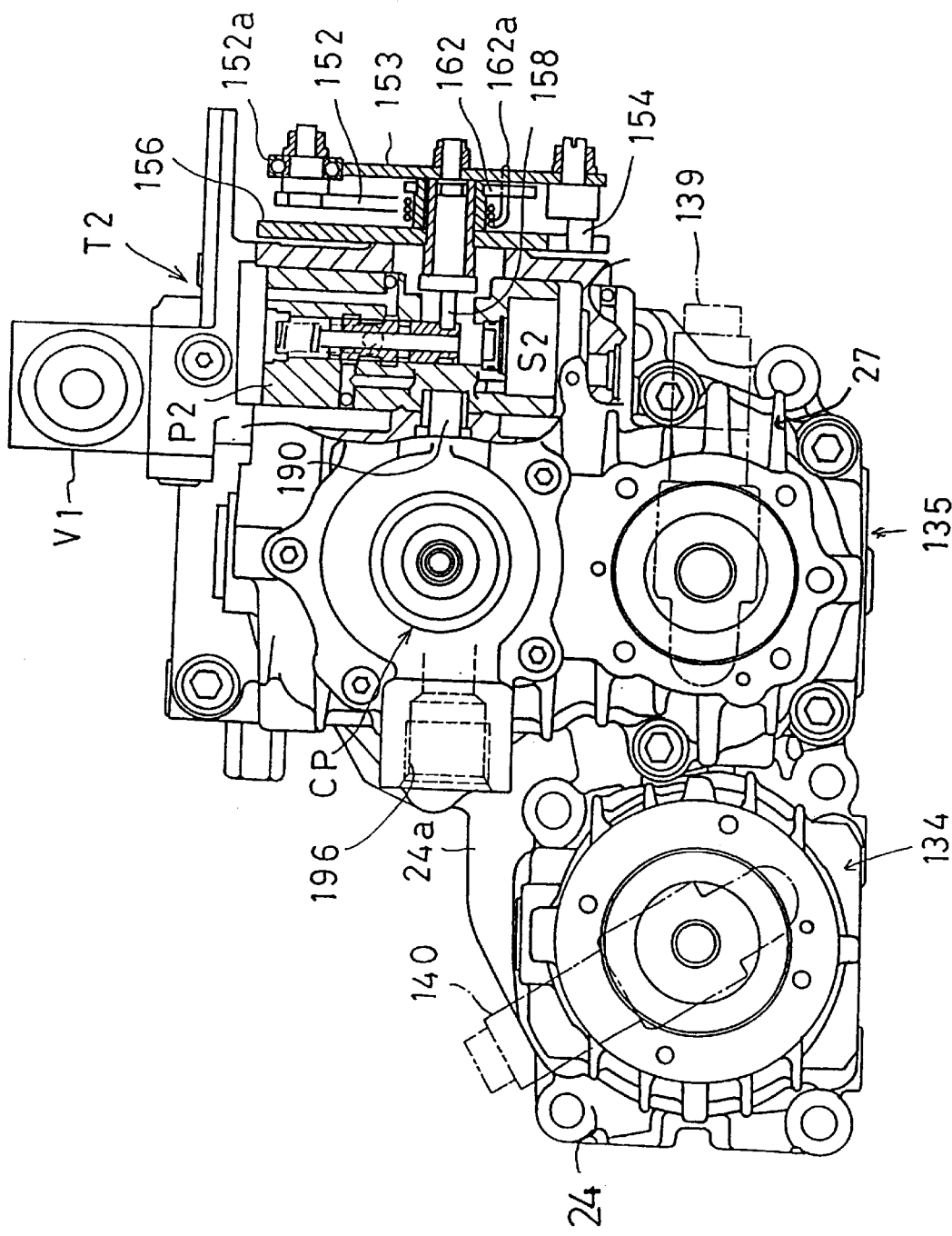
FIG. 10 is a partly sectional left side view of the same.

Referring to the driving servomechanism T1 shown in FIGS. 8 through 10, the spool S3 constituting the manual speed changing control valve V3 made of an electromagnetic switching valve is operated so as to move the piston P1 vertically, thereby rotating the swash plate 145 for the speed changing operation of the driving HST mechanism 25 for driving.

Since the driving HST mechanism 25 needs to be held in its neutral stage, a driving neutral retained arm 148 is provided in the condition that a driving neutral retained roller 148a is pivoted onto the utmost end thereof. A driving neutral cam 149 rotates integrally with a speed changing operation arm 151 so that the driving neutral retained roller 148a enters a recessed portion formed by the middle portion of the driving neutral cam 149, thereby holding the neutral condition.

Also, the speed changing operation arm 151 is rotatable through a shock absorb spring 151a and is provided with an integrally rotatable driving stopper shaft 150. When the driving stopper shaft 150 engages with a stopper plate 157, the speed changing operation arm 151 is prevented from its further rotation.

A crank arm 159 engaging into the recessed portion of the spool S1 for operating the spool S1 is connected with the speed changing operation arm 151 through the shock absorb spring 151a. The spool S1 slides in the piston P1, thereby constituting the manual speed changing control valve V3.

Figure 11:
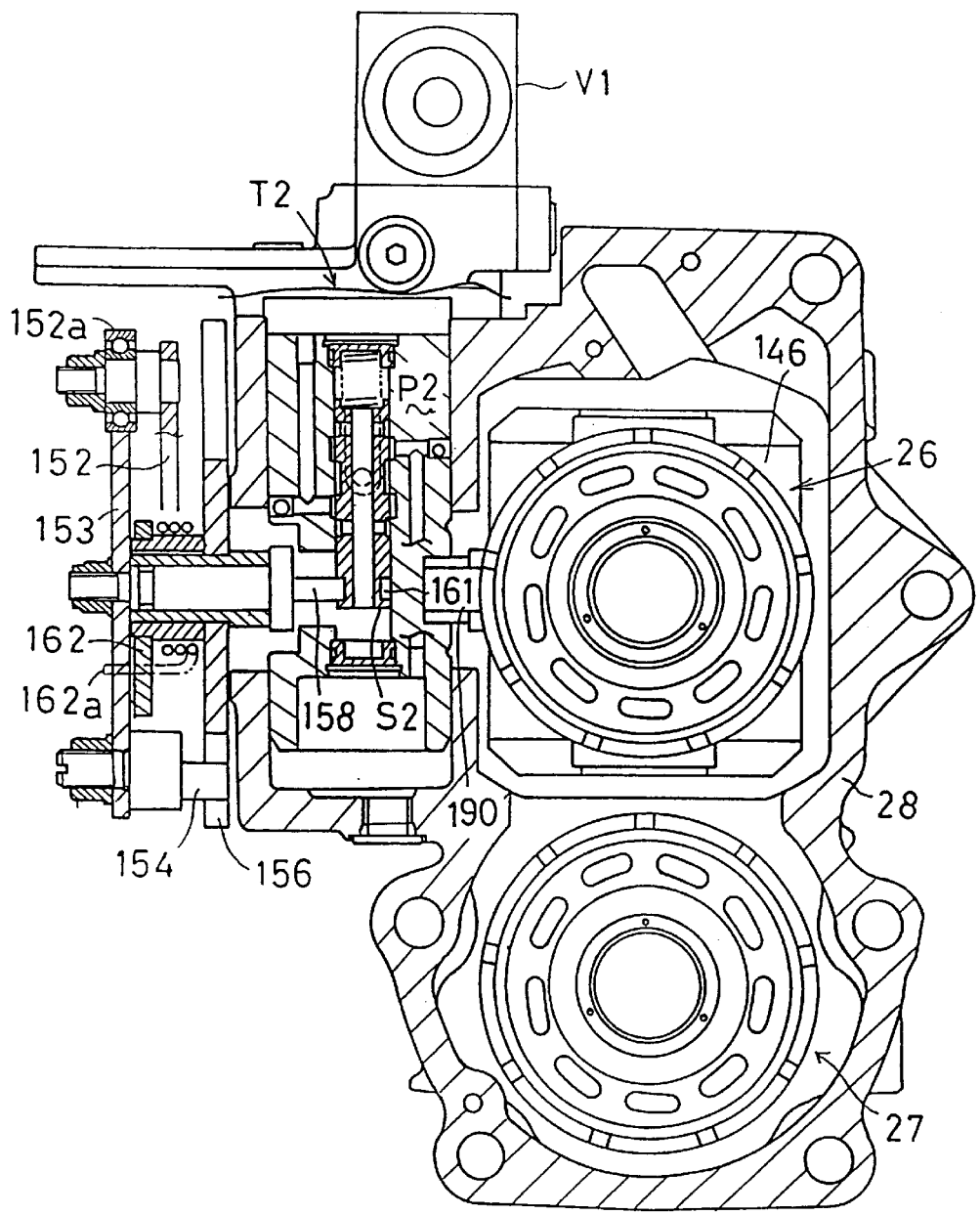
FIG. 11 is a partly sectional right side view of the same showing a hydraulic steering pump 26 and a steering servomechanism T2.

As shown in FIG. 11, the similar steering servomechanism T2 is constructed so as to rotate the swash plate 146 of the steering hydraulic pump 26. The steering servomechanism T2 of the steering hydraulic pump 26 is substantially similar and laterally symmetrical to the driving servomechanism T1.

Figure 23:
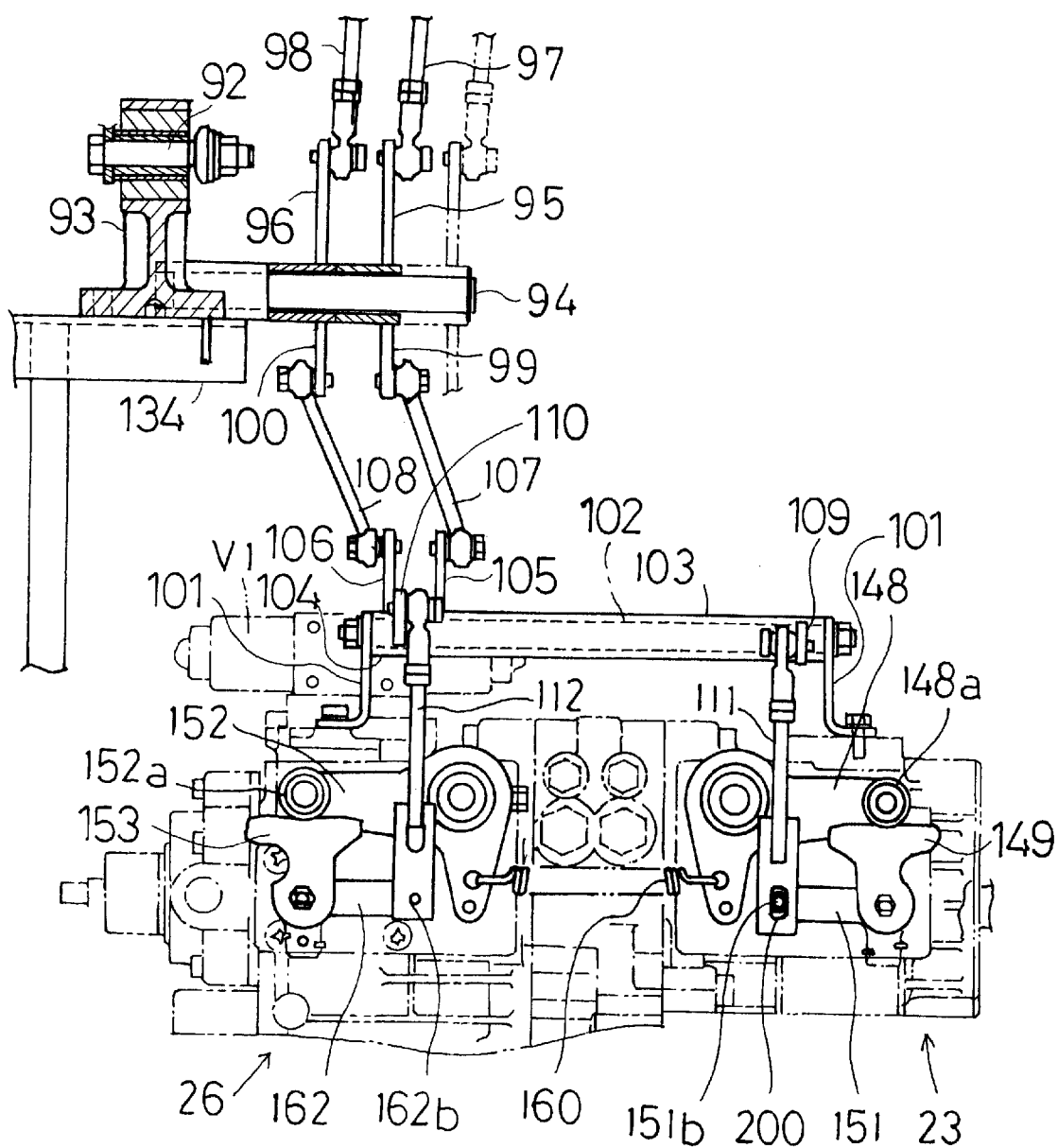
FIG. 23 is a front view of the same.

In this regard, as shown in FIGS. 8, 11, 23 and so on, a steering neutral retained arm 152 is provided so as to be rotatable together with a steering operation arm 162 and a steering neutral retained roller 152a is pivotally supported on the steering neutral retained arm 152. A steering neutral cam 153 is provided for abutting against the steering neutral retained roller 152a. A steering stopper shaft 154 and a steering stopper plate 156 for engaging with the steering stopper shaft 154 are provided. The steering operation arm 162 is provided with a shock absorb spring 162a.

With respect to the laterally symmetrical driving and steering servomechanisms T1 and T2, a biasing spring 160 is interposed between the driving and steering neutral retained arms 148 and 152 so as to bias the driving and steering neutral retained rollers 148a and 152a toward the driving and steering cams 149 and 153 at all the times, respectively. When the rollers 148a and 152a engage with the neutral portions formed on the cam faces of the neutral cams 149 and 153, respectively, the crawlers 2 is held in the operationally neutral condition.

Next, the arrangement of the steering hydraulic pump and motor 26 and 27 of the steering HST mechanism 28 and the steering servomechanism T2 will be described according to FIG. 11.

The steering servomechanism T2 is concealed in the interior of the casing of the steering HST mechanism 28 attached on the center section C. The construction thereof is similar to the driving HST mechanism 25, whose casing is attached on the other surface of the center section C. The driving servomechanism T1 is constructed integrally with the driving hydraulic pump 23 in the condition of being concealed in the casing of the driving hydraulic pump 23.

The slide directions of the spools S1 and S2 and the pistons P1 and P2 of the driving and steering servomechanisms T1 and T2 are identical with the vertical rotational directions of the cradle type swash plates provided on the driving and steering hydraulic pumps 23 and 26, respectively.

The pistons P1 and P2 are connected with the cradle type swash plates 145 and 146 through joint pins 190 respectively.

As shown in FIG. 8, the charge pump CP is provided with a suction port 196 and a discharge port 195, so as to suck operating oil from an operating oil tank through the suction port 196 and discharge it as pressure oil through the discharge port 195. The discharged oil passes an operating oil filter and enters a supply port 194 opening at the upper portion of the center section C. A part of the oil into the center section C is supplied into the closed fluid circuits of the driving and steering HST mechanisms 25 and 28 through the check valve and orifice units 137, 138 and 141, respectively, while excessive operating oil is discharged into the interior of the steering HST mechanism 28 through a relief valve 199, thereby being used as cooling oil.

Explanation will be given on the linkage interlocking the speed changing lever 68 and the steering wheel 19 with the speed changing operation arm 151 and the steering operation arm 162, respectively, in accordance with FIGS. 12 through 29.

As shown in FIGS. 12 through 29, the speed changing lever 68 as a driving operation means to be connected to the driving HST mechanism 25 is interlocked with the steering wheel 19 to be connected to the steering HST mechanism 28 by a speed changing and steering joint linkage 69. The speed changing and steering joint linkage 69 interlocks with the driving and steering HST mechanisms 25 and 28 through speed changing and steering linkages 70 and 71, respectively.

Referring to the speed changing and steering joint linkage 69, as shown in FIGS. 12, 15, 16 and 17, a basic crank end 68a of the speed changing lever 68 is laterally rotatably journalled through a cylinder 74 fixed to a longitudinally rotatable rotary plate 75. The rotary plate 75 is pivoted centering a first pivotal shaft 77 rotatably supported on a fixing stay 78 which is integral with a vehicle body frame 76.

The cylinder 74 is rotated by the rotational operation of the speed lever 68, thereby rotating the rotary plate 75 which is integral with the cylinder 74.

The rotary lever 75 has a longitudinally extending second pivotal shaft 79 in perpendicular to the first pivotal shaft 77. When the rotary plate 75 rotates centering the first pivotal shaft 77 by the rotational operation of the speed changing lever 68, the second pivotal shaft 79 is also longitudinally rotated.

Figure 15:
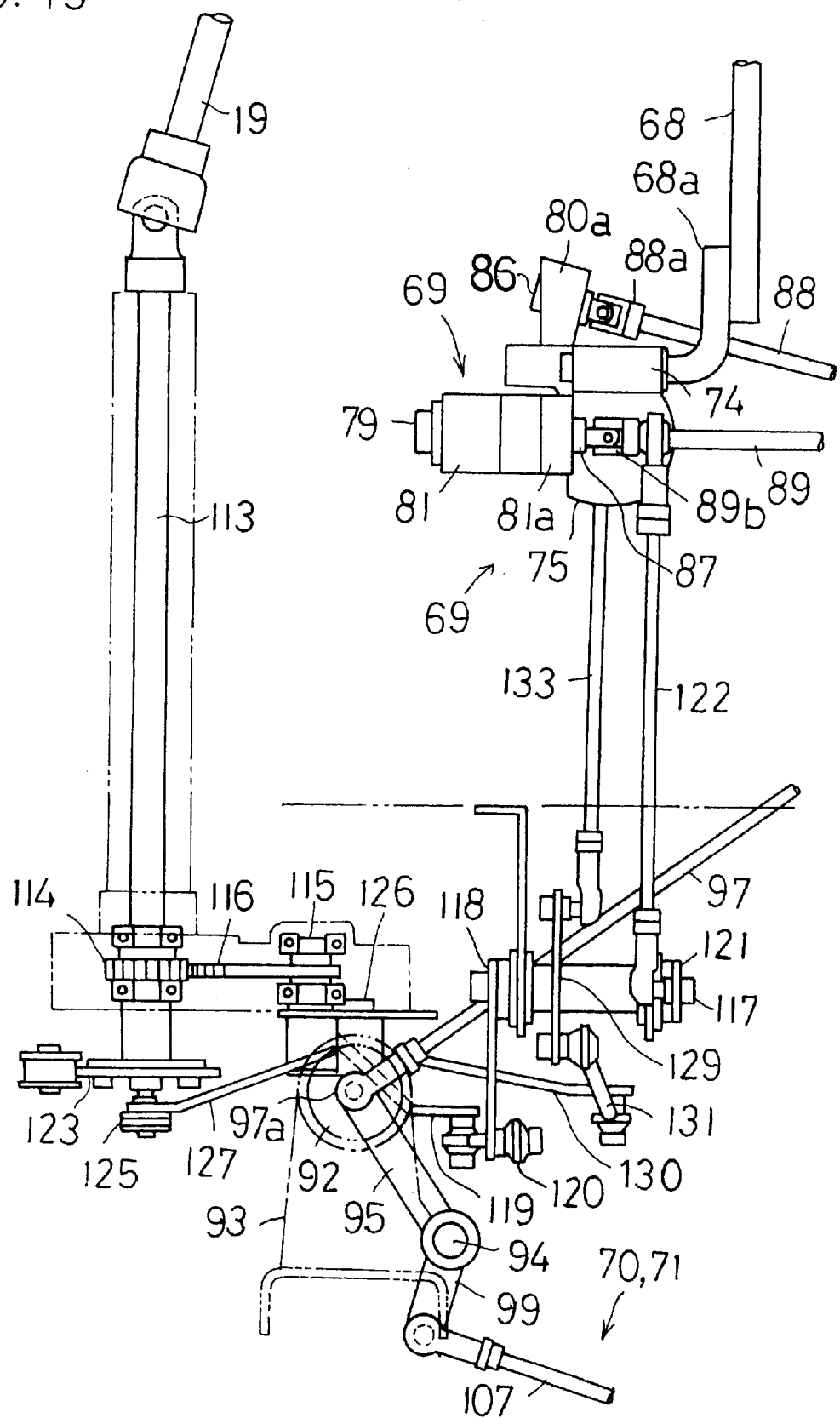
FIG. 15 is a fragmentary enlarged side view of the operation mechanism.
Figure 16:
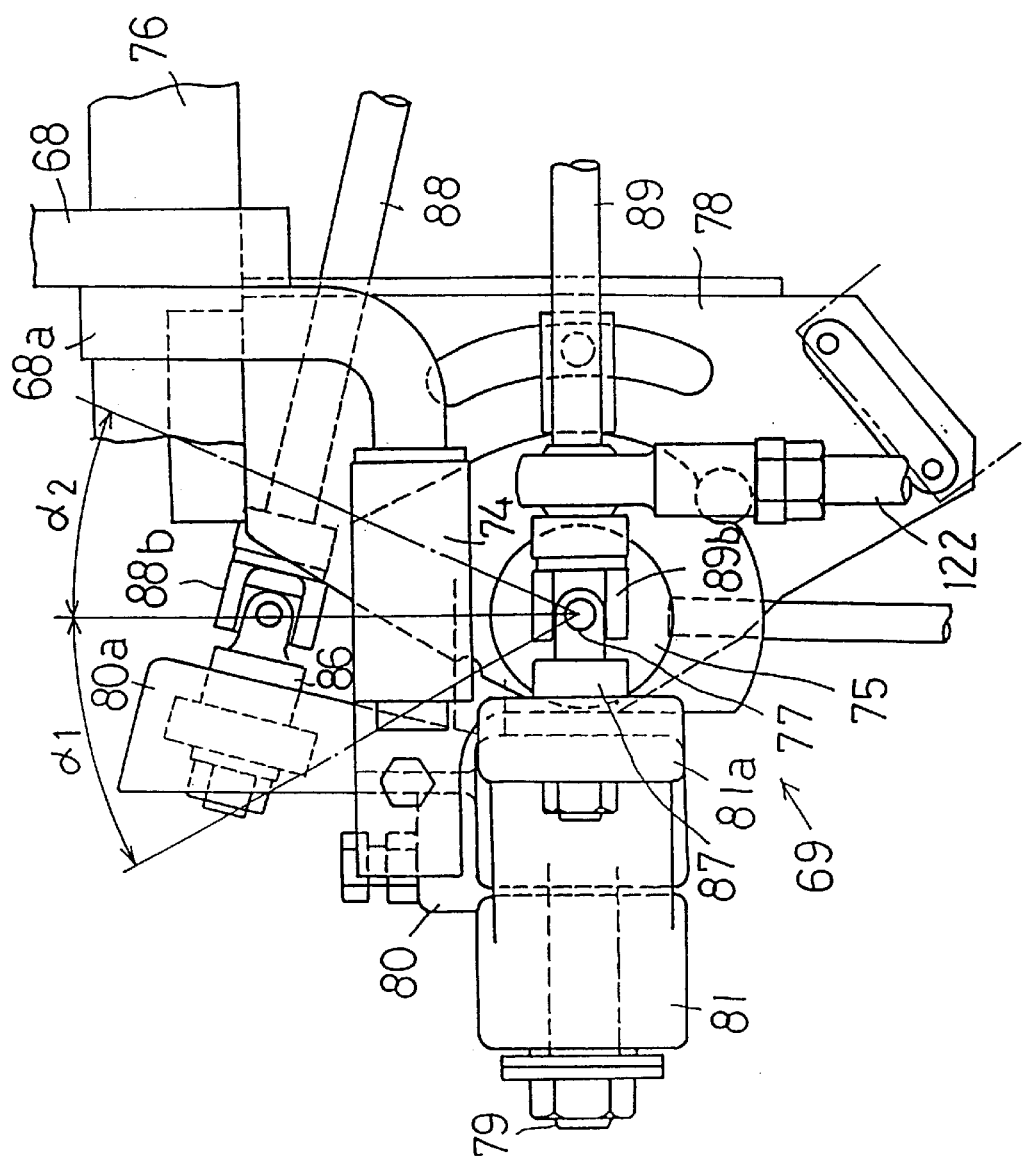
FIG. 16 is a side view of operation members.
Figure 17:
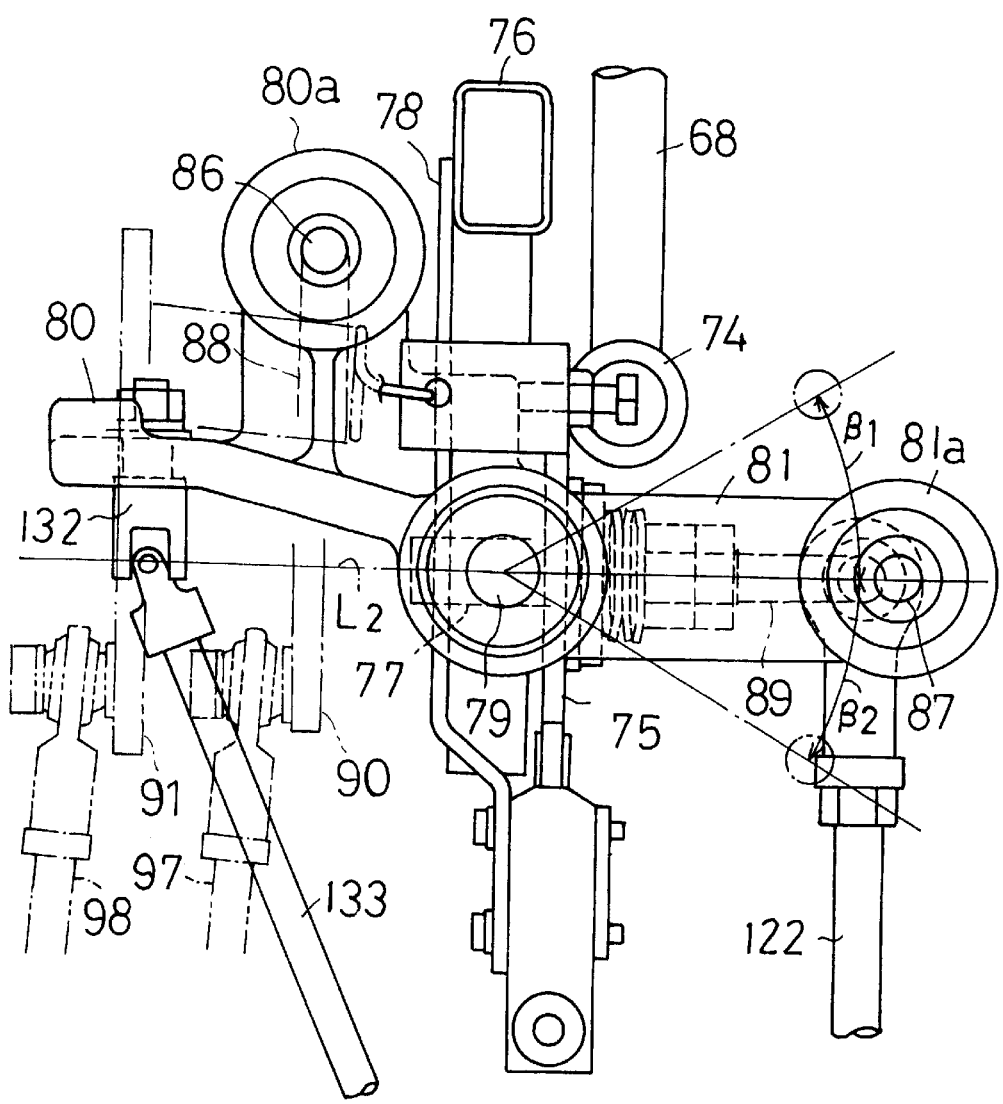
FIG. 17 is a front view of the operation members.
Figure 18:
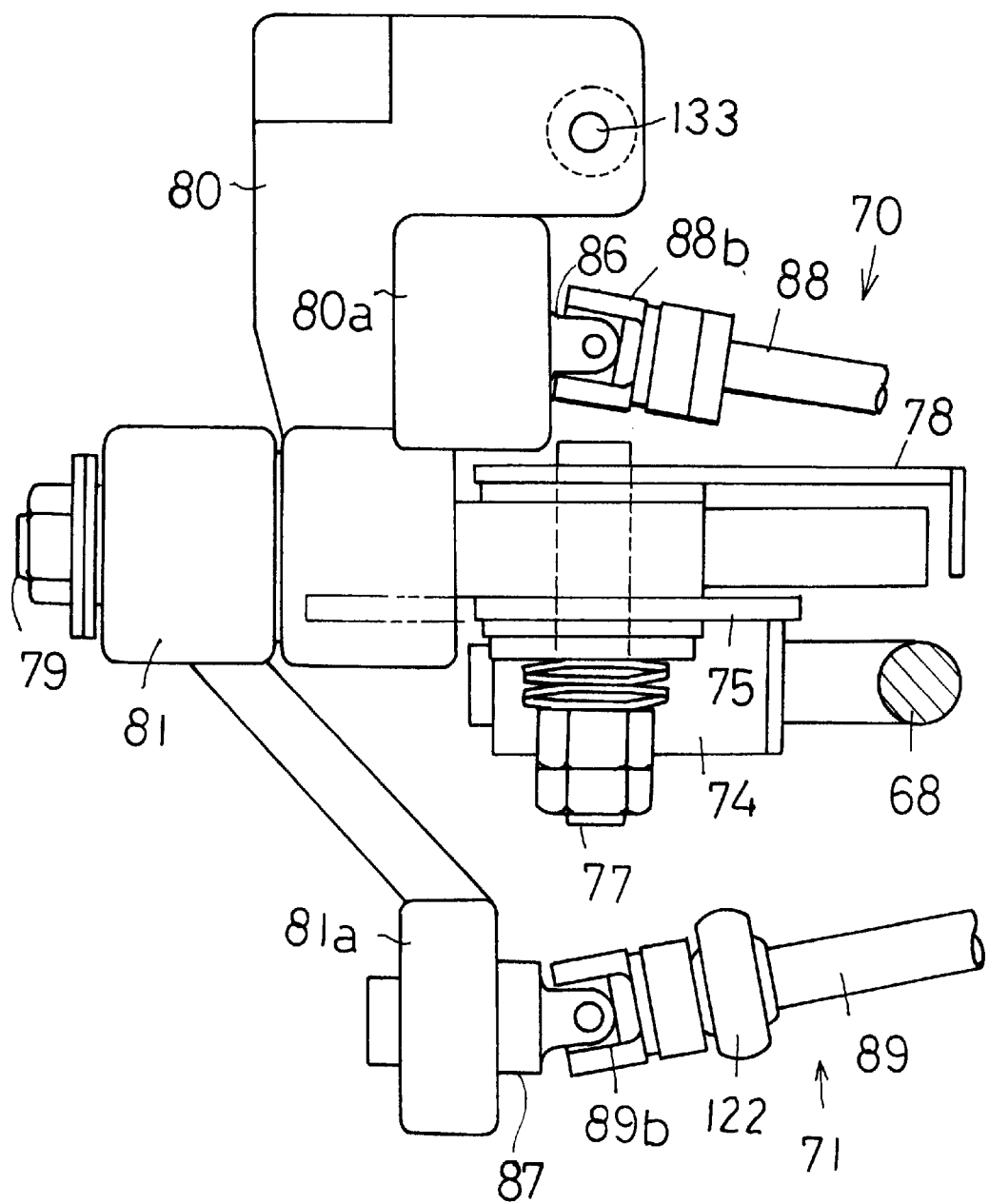
FIG. 18 is a plan view of the operation members.

As shown in FIGS. 15 through 17 and so on, a speed changing operation member 80 and a steering operation member 81 are rotatably supported on the second pivotal shaft 79, individually.

The speed changing operation member 80 pivoted about the second pivotal shaft 79 has an eccentric operational output portion 80a so as to be connected to the speed changing linkage 70, and the steering changing operation member 81 pivoted about the second pivotal shaft 79 has an eccentric output portion 81a so as to be connected to the steering linkage 71.

The speed changing and steering linkages 70 and 71, which are to be connected to the speed changing operation arm 151 and the steering operation arm 162 respectively, are operable around a swing shaft 82 according to the movement of the speed changing and steering joint linkage 69. The swing shaft 82 is disposed behind the speed changing and steering joint linkage 69 and is supported by the vehicle body frame 76.

Figure 21:
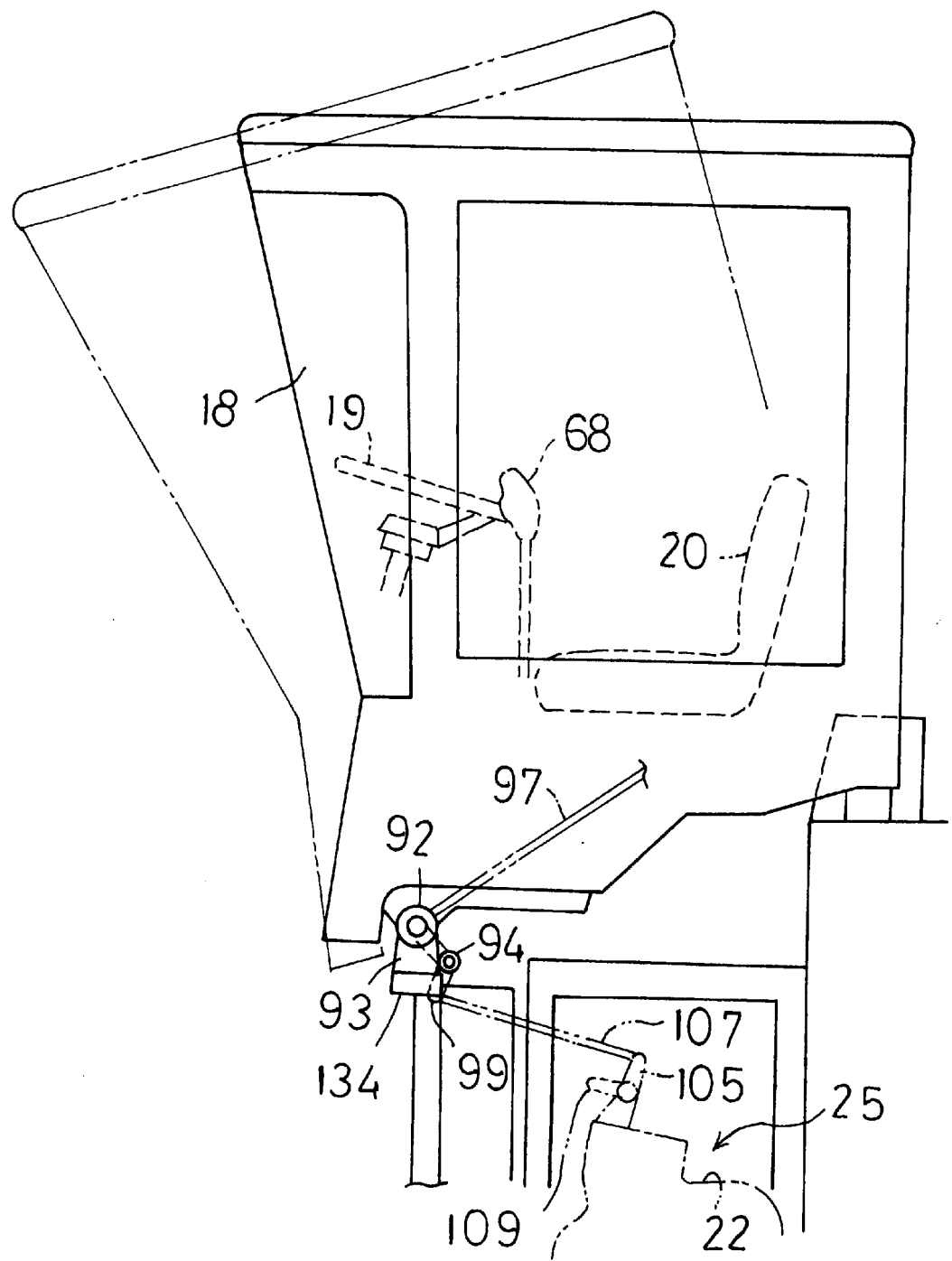
FIG. 21 is a side view of an operator's cab.

As shown in FIG. 21, a universal joint type speed changing first rod 97 and a universal joint type steering first rod 98 are extended from the place of the swing shaft 82, so as to be connected with portions of first swing arms 95 and 96, respectively, placing on a rotational fulcrum shaft 92 of the operator's cab 18.

Universal joint type second rods 107 and 108, second swing arms 109 and 110 and the like are connected to the first swing arms 95 and 96, respectively, thereby constituting the speed changing and steering linkages 70 and 71.

Figure 14:
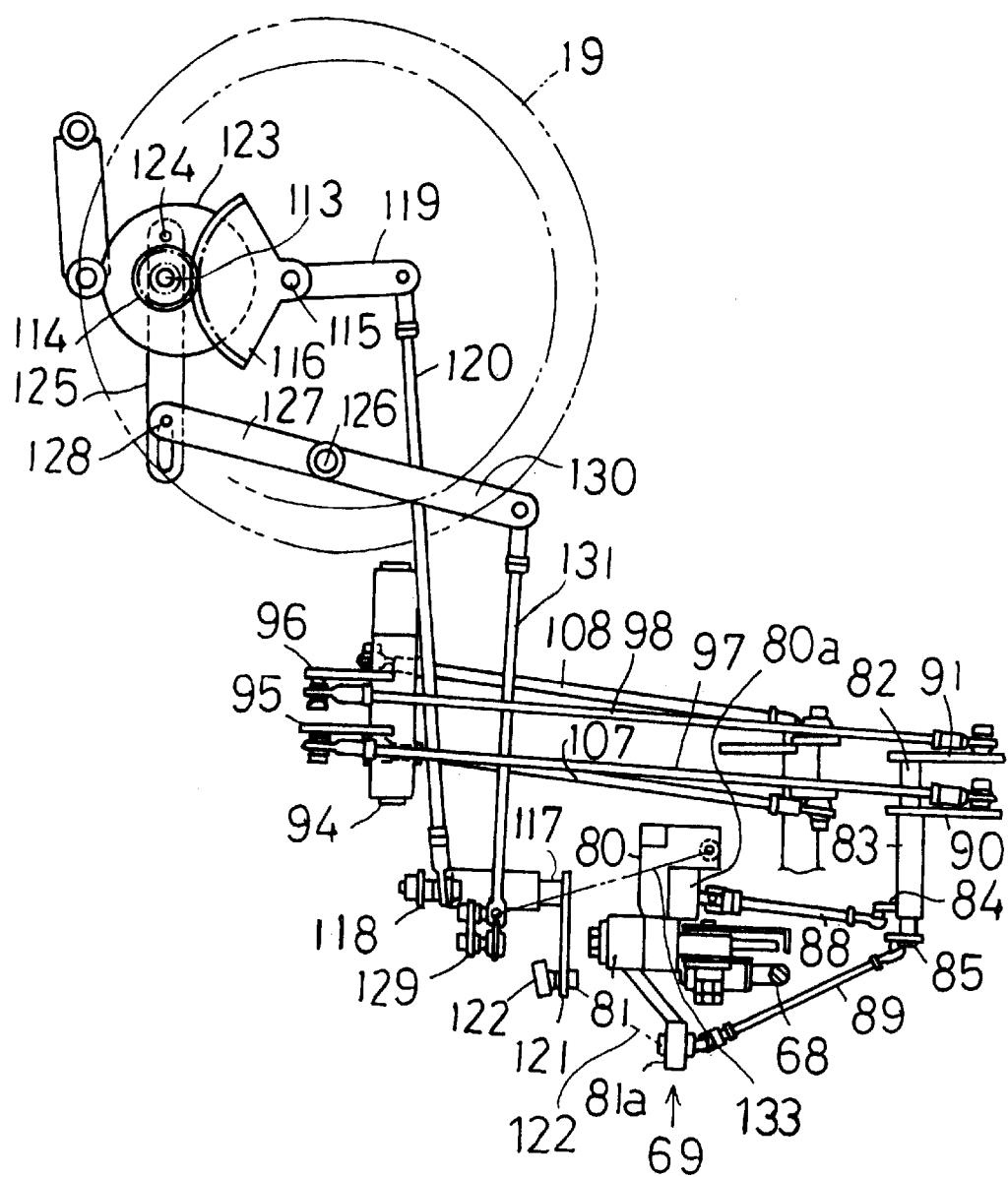
FIG. 14 is a plan view of the operation mechanism.
Figure 20:
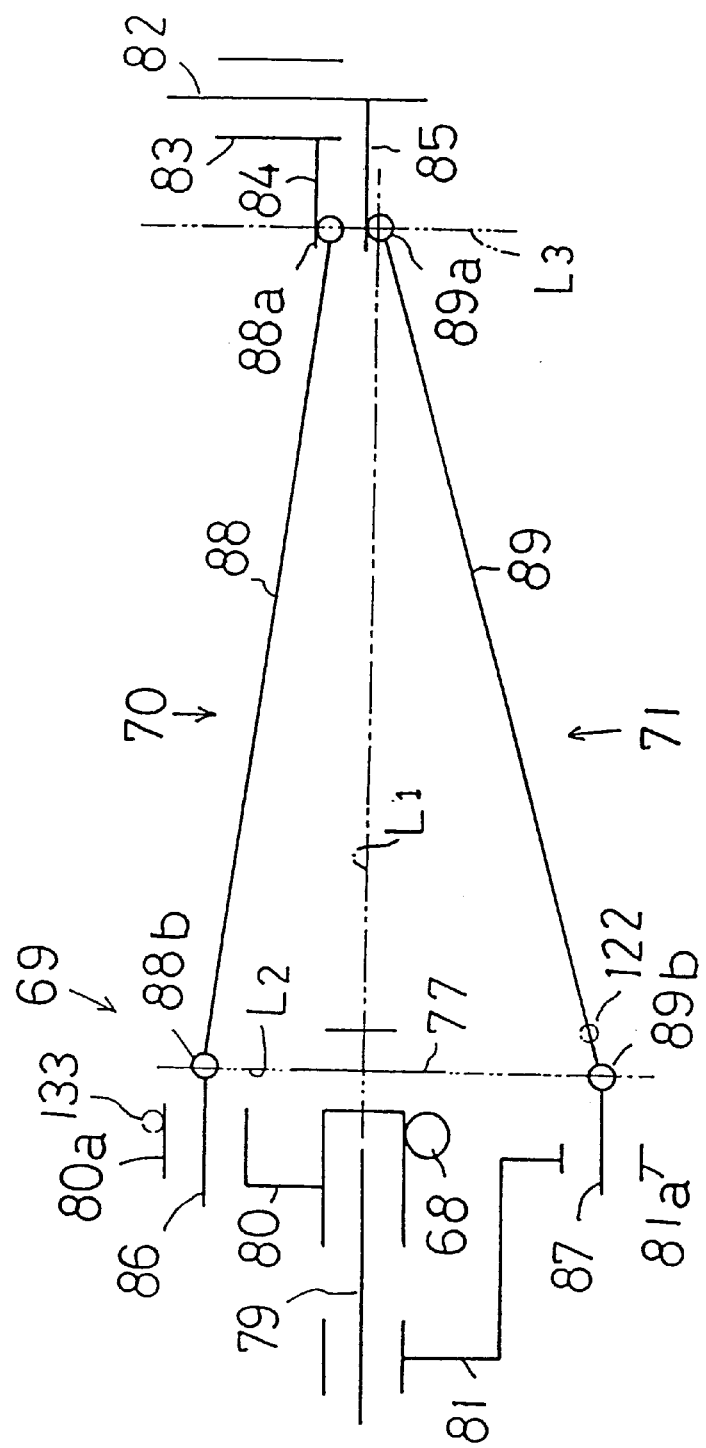
FIG. 20 is a schematic plan view of a linkage.

Detailed description of the speed changing and steering linkages 70 and 71 is as follows:

As shown in FIGS. 14 and 20, a swing cylinder 83 is rotatably disposed on the periphery of the swing shaft 82. A speed changing arm 84 is fixed to the swing cylinder 83.

A steering arm 85 is fixed to the swing shaft 82.

Figure 12:
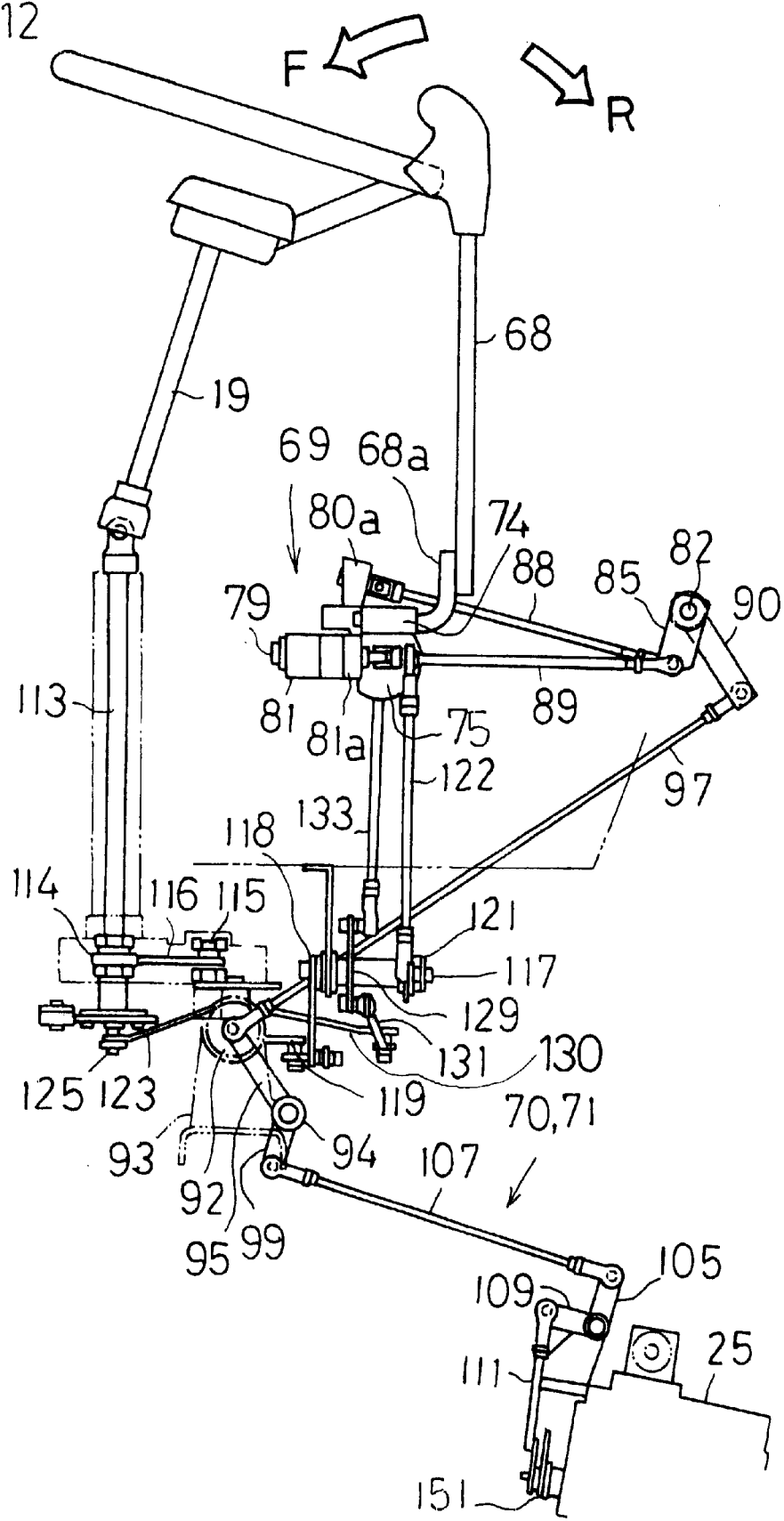
FIG. 12 is a side view of the operation mechanism for driving and steering.
Figure 13:
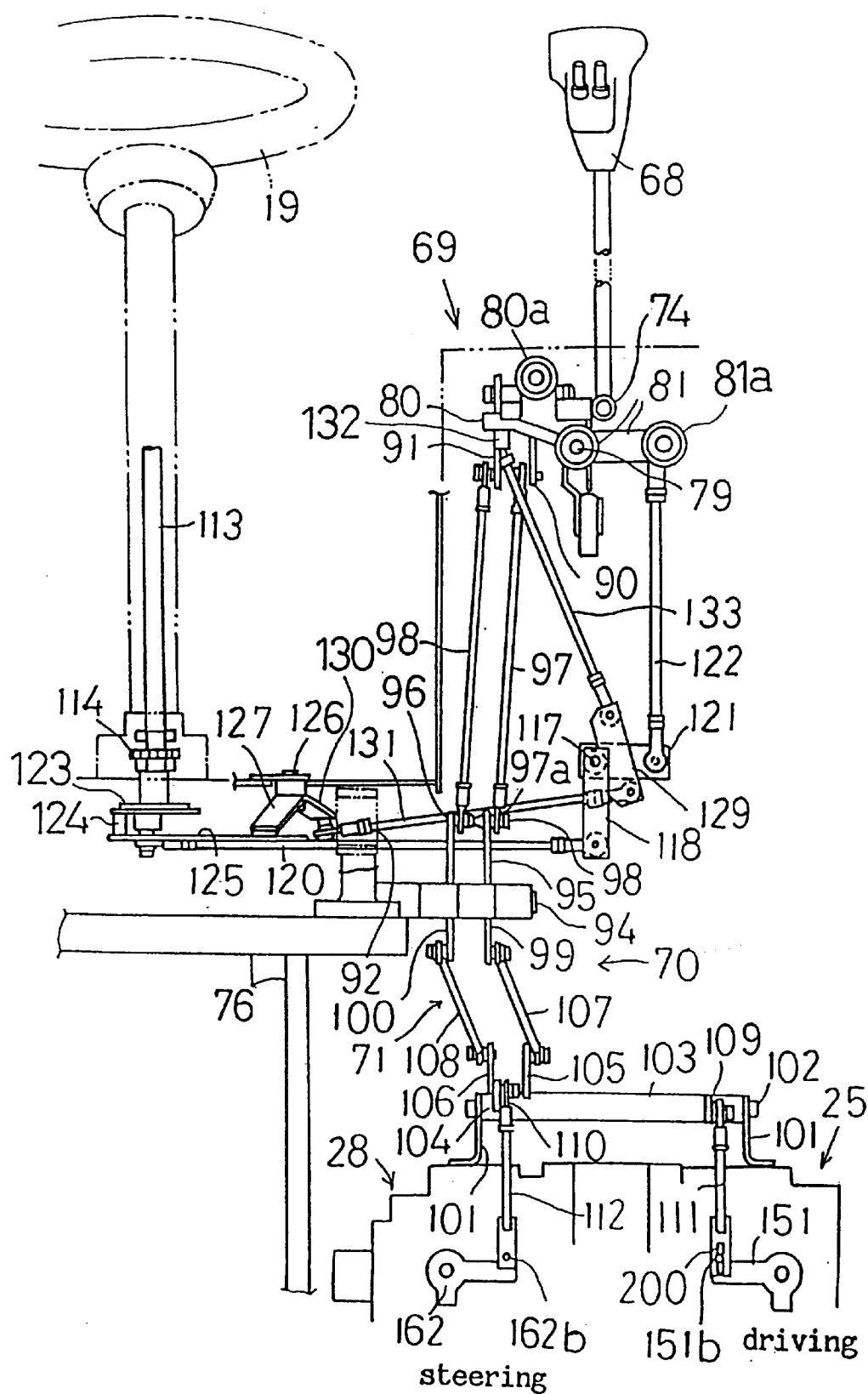
FIG. 13 is a front view of the operation mechanism.

As shown in FIGS. 15 through 17, the speed changing operation member 80 and the steering operation member 81 individually pivoted on the second pivotal shaft 79 are provided at the output portions 80a and 81a thereof with operational output shafts 86 and 87, respectively. As shown in FIGS. 12, 14 and 20, universal joint shafts 88 and 89 are interposed between the operational output shafts 86 and 87 and the arms 84 and 85, respectively.

As shown in FIGS. 12 through 15 and 21 through 24, a speed changing output arm 90 and a steering output arm 91 are fixed onto the right ends of the swing shaft 82 and the swing cylinder 83, respectively. A middle shaft 94 is provided on a fulcrum bearing 93 for the rotational fulcrum shaft 92 of the operator's cab 18 and the speed changing and steering first swing arms 95 and 96 are rotatably supported on the middle shaft 94. The speed changing and steering output arms 90 and 91 are connected with the speed changing and steering first swing arms 95 and 96 through the speed changing and steering first rods 97 and 98, respectively.

A speed changing second swing arm 99 and a steering changing second swing arm 100 integrally joining the respective first swing arms 95 and 96 are disposed on the middle shaft 94.

A cylinder for speed changing 103 and a cylinder for steering 104 are rotatably supported around a support shaft 102 supported between a pair of bearing plates 101 on top of the transmission casing 22. First swing arms 105 and 106 are fixed at the basic ends thereof onto the cylinders 103 and 104, respectively. The universal joint type speed changing and steering second rods 107 and 108 are interposed between the utmost ends of first swing arms 105 and 106 and the second swing arms 99 and 100, respectively.

Second swing arms 109 and 110 are fixed at the basic ends thereof onto the cylinders 103 and 104. A speed changing servo rod 111 and a steering servo rod 112 are interposed between the second swing arms 109 and 110 and the utmost ends of control levers 72 and 73, respectively.

Due to such constructed speed changing and steering linkages 70 and 71, the speed changing operation arm 151 is operated by the rotation of the speed changing operation member 80 centering the first pivotal shaft 77, and the steering operation arm 162 is operated by the rotation of the steering operation member 81 centering the second pivotal shaft 79 during travelling, thereby controlling speed changing and steering.

Next, referring to FIGS. 12 through 20 and 25 through 29, the interlocking mechanism between the steering wheel 19 and the joint linkage 69 will be described.

As shown in FIGS. 12 through 15 and 19, a steering wheel operation shaft 113 of the steering wheel 19 is provided at the lower end thereof with a gear 114, which engages with a sector gear 116 attached to a rotary shaft 115 behind the gear 114.

A first swing arm 118 of a steering shaft 117 is disposed below the speed changing lever 68.

A universal type steering first rod 120 as a steering link is interposed between the utmost end of the first swing arm 118 and the utmost end of an output arm 119 fixed at the basic end thereof onto the rotary shaft 115.

A universal type steering second rod 122 is interposed between a second swing arm 121, which is integral with the first swing arm 118 of the steering shaft 117, and the front end of the universal joint shaft 89.

Accordingly, the steering operation member 81 is rotated centering the second pivotal shaft 79 by the rotational operation of the steering wheel 19.

A neutral index plate 123 is disposed below the gear 114 of the steering wheel operation shaft 113. An end of a steering detecting link 125 is connected to a projecting shaft 124 from the lower surface of the neutral index plate 123.

A first swing arm 127 of a speed reduction arm shaft 126 at the right side of the rotary shaft 115 is connected into a long hole 125a bored in the other end of the steering detecting link 125 through a shaft 128.

A universal joint first speed reduction rod 131 as a speed reduction link is interposed between the utmost end of a speed reduction arm 129 of the steering shaft 117 and the utmost end of a second swing arm 130 of the speed reduction arm shaft 126.

As shown in FIGS. 14 and 17, a universal joint type second speed reduction rod 133 is interposed between a speed reduction transmission shaft 132 at the most rightward end of the speed changing operation member 80 and the other end of the first speed reduction rod 131. During travelling, as the operational degree of the steering wheel 19 is increased, the second speed reduction rod 133 is pulled downwardly, thereby reducing the travelling speed.

Then, as shown in FIG. 20, on a longitudinally horizontal line L1 are disposed the second pivotal shaft 79, on which the speed changing and steering operation members 80 and 81 are rotatably supported, the steering arm 85 and the joint shaft 89.

On a laterally horizontal line L2 in perpendicular to the line L1 are disposed the universal joint portion 88b between the operational output shaft 86 and the universal joint shaft 88, and the universal joint portion 89b between the operational output shaft 87 and the universal joint shaft 89.

Furthermore, on a laterally horizontal line L3 in parallel to the line L2 are disposed the universal joint portion 88a between the speed changing shaft 84 and the joint shaft 88, and the universal joint portion 89a, so that each of the operation members 80 and 81 rotates just centering each of the first and second pivotal shafts 77 and 79 while either of the speed changing lever 68 and the steering wheel 19 in neutral is operated, thereby preventing its acting force from being applied on the universal joint shaft 88 or 89.

As shown in FIG. 16, when the speed changing operation member 80 is slantingly rotated centering the first pivotal shaft 77 either forwardly at an angle $\alpha 1$ during the advancing operation of the speed changing lever 68 or rearwardly at an angle $\alpha 2$ during the reversing operation of the same, the universal joint shaft 88 is pulled or pushed, thereby making the speed changing arm 84 act for speed changing of the vehicle in advancing or reversing.

As shown in FIG. 17, in the situation that the speed changing lever 68 is out of neutral, when the steering operation member 81 is rotated centering the second pivotal shaft 79 either upwardly at an angle $\beta 1$ or downwardly at an angle $\beta 2$ by rotational operation of the steering wheel 19, the universal joint shaft 89 is pulled or pushed, thereby rotating the steering arm 85 for leftward or rightward turning of the vehicle.

In other words, during the steering operation while the main speed changing mechanism is neutral, the universal joint shaft 89 also moves on a surface of a cone centering the line L1, thereby keeping the distance between the universal joint portions 89a and 89b constant, whereby the steering hydraulic pump 27 of the HST mechanism 28 is not rotated.

Figure 19:
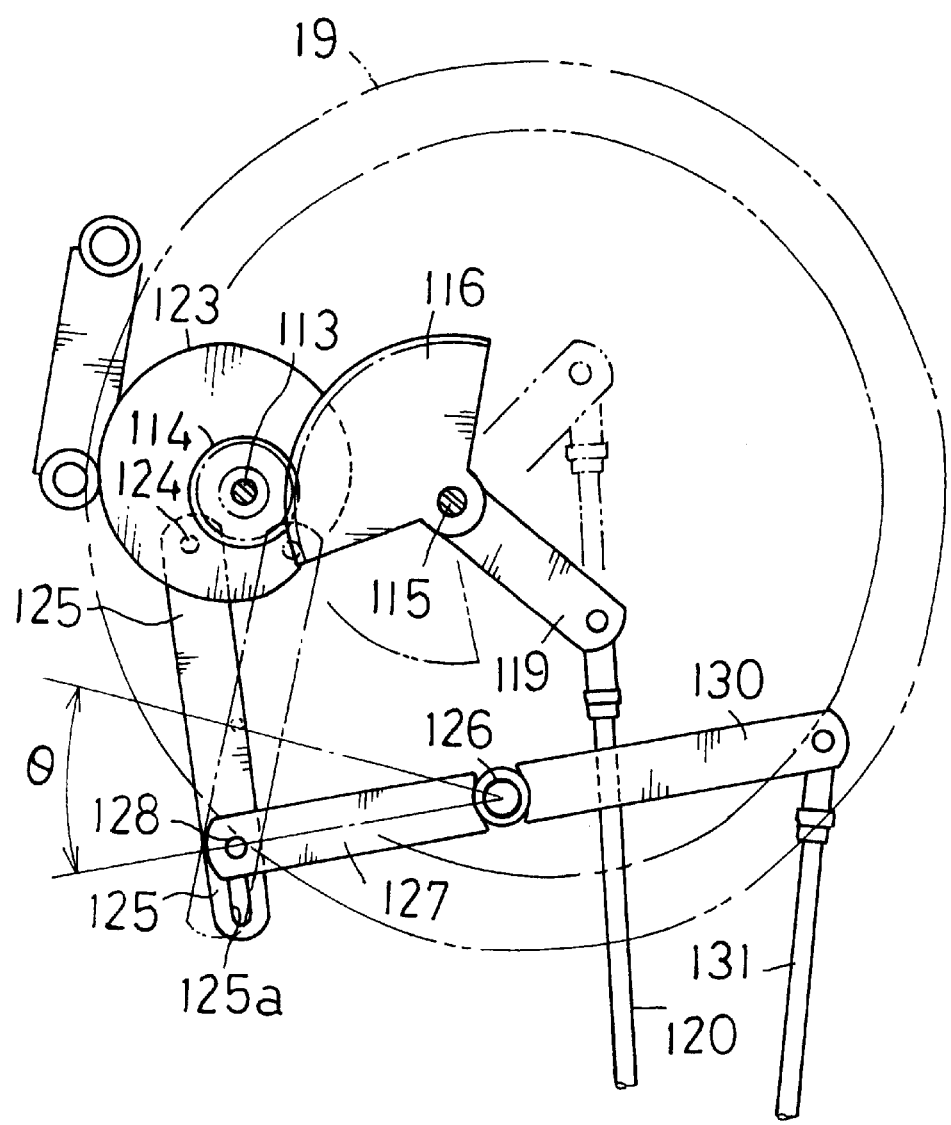
FIG. 19 is a plan view of the mechanism of the steering wheel.

As shown in FIG. 19, whether the steering wheel 19 in neutral is operated for left turning or right turning, the detecting link 125 restricts the first swing arm 127 to rotate within an angle $\theta$ in the same direction, thereby holding the second speed reduction rod 133 being pulled at all times. When the speed changing operation member 80 is slantingly rotated toward the position of the angle $\alpha 1$ shown in FIG. 16 for advancing operation, the distance between the universal joint portions 88a and 88b is reduced, and when toward the position of the angle $\alpha 2$, it is increased, so that the speed changing arm 84 shown in FIG. 12 regarding to the HST mechanism 25 is moved toward the neutral position, thereby decelerating the vehicle in correspondence to the degree of steering.

Additionally, as shown in FIG. 21, the centers of the universal joint portions 97a and 98a between the first rods 97 and 98 and the first swing arms 95 and 96, serving as mechanisms transmitting the operational force for speed changing and steering respectively, coincide with the rotational fulcrum shaft 92 for rotation of the operator's cab 18 during neutral of speed changing and steering, so that the operator's cab 18 can be rotated forwardly without removing the operational mechanisms when the neutral condition of speed changing and steering is held.

In this regard, the middle shaft 94 is integrally supported by the fulcrum bearing 93 fixed to a front fulcrum stay 134 on the body frame 3. During the neutral condition of speed changing and steering, the centers of the universal joint portions 97 and 98 of the first rods 97 and 98 and the swing arms 95 and 96 axially coincide with the rotational fulcrum shaft 92, so that, when the operator's cab 18 is rotated forwardly centering the rotational fulcrum shaft 92, the first rods 97 and 98 are integrally rotated centering the middle shaft 94, thereby enabling the operator's cab 18 to be opened without losing their relationship with the first swing arms 95 and 96.

Thus, while the operation means in the operator's cab 18 and the transmission mechanisms 25 and 28 with the transmission casing 22 are connected by the linkages 70 and 71 comprising the rods 97, 98, 107, 108 and the like, the operator's cab 18 can be opened without removing such members of the linkages and additionally, the propagation of vibration from the operator's cab 18 through the linkages 70 and 71 can be suppressed to the minimum.

Obviously as the above mentioned embodiment, with respect to the operation mechanisms of the combine provided with the operator's cab 18 including the operation means (the steering wheel 19 and the speed changing lever 68), which is rotatable centering the rotational fulcrum shaft 92, the operational rods 97 and 98 are connected with the operational rods 107 and 108 through the rotational fulcrum shaft 92 so as to connect the operation means 19 and 68 with the transmission means (the transmission casing 22) steadily, however, the operator's cab 18 can be easily opened without removing the operational rods 97, 98, 107 and 108 and the propagation of vibration from the operator's cab 18 to the transmission means 22 can be restricted to the minimum.

Since the connecting position between the speed changing operation rods 97 and 107 for interlocking the speed changing operation lever 68 with the speed changing hydrostatic transmission mechanism 25 is disposed on the fulcrum shaft 92, the speed changing operation rods 97 and 107 for the speed changing lever 68 are not required to be removed when the operator's cab 18 is rotated to open, thereby enabling the nice opening of the operator's cab 18.

Also since the connecting position between the steering operation rods 97 and 107 for interlocking the steering operation wheel 68 with the steering hydrostatic transmission mechanism 25 is disposed on the fulcrum shaft 92, the steering operation rods 97 and 107 for the steering wheel 19 are not required to be removed when the operator's cab 18 is rotated to open, thereby enabling the nice opening of the operator's cab 18.

Figure 22:
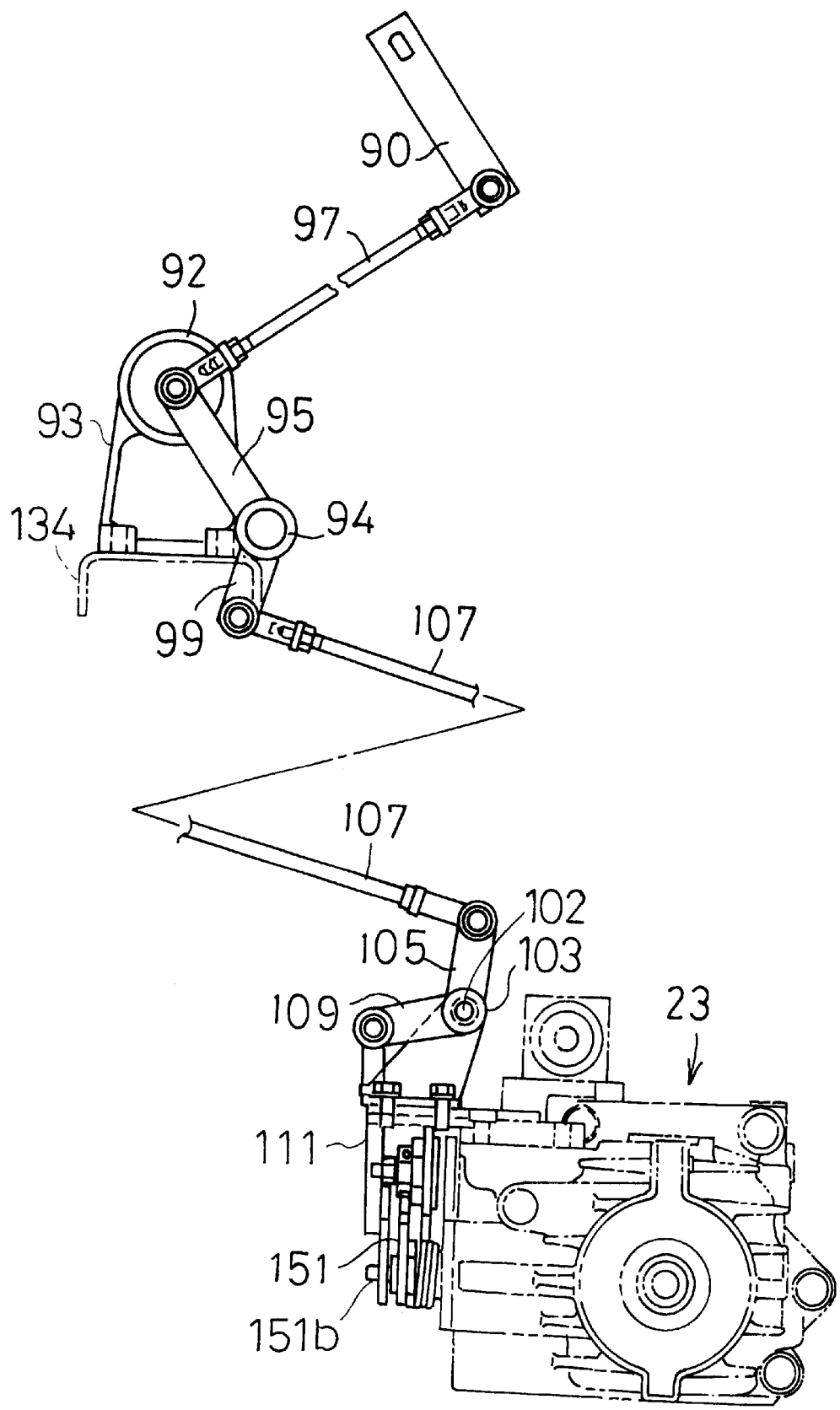
FIG. 22 is side view of the connecting mechanism between a speed changing servo rod 111 with a speed changing operation arm 151 and a steering servo rod 112 with a steering operation arm 162.
Figure 24:
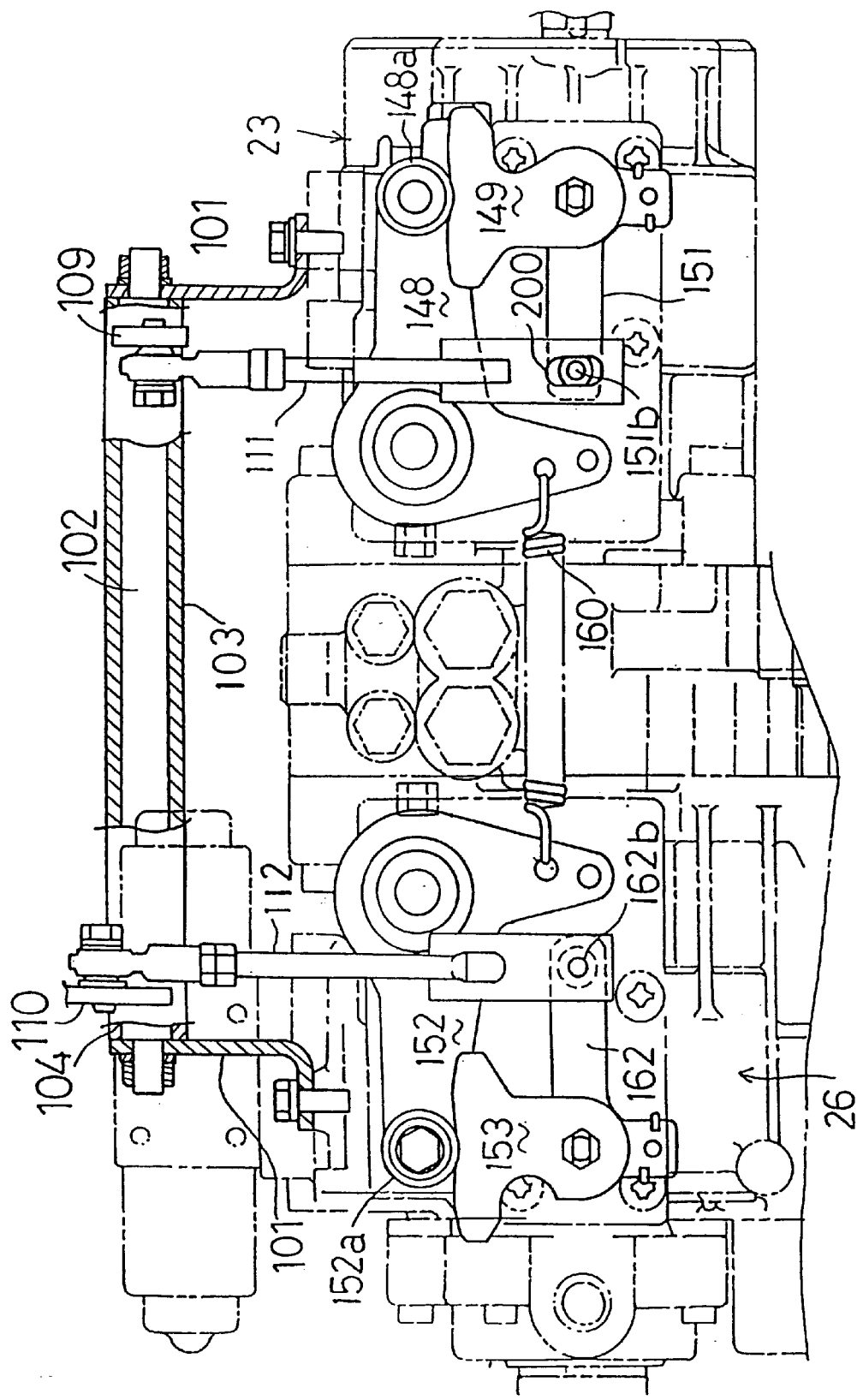
FIG. 24 is an enlarged view of the connecting mechanism of the HST device H shown in FIG. 23.

The above mentioned construction applies the mechanism as shown in FIGS. 22 through 24. The speed changing servo rod 111, which is vertically operated according to the operation of the speed changing lever 68, is bored in its connecting portion with the speed changing operation arm 151 for operating the swash plate 145 of the driving hydraulic pump 23 by a long hole 200 providing a clearance.

The connecting pin 151b of the speed changing operation arm 151 is engaged into the long hole 200, so that the backlash generated on the long linkage between the speed changing lever 68 and the speed changing operation arm 151 is absorbed therein.

While such a clearance is provided by the long hole 200, the driving neutral retained arm 148 with the driving neutral retained roller 148a is provided so as to bias the swash plate 145 of the driving hydraulic pump 23 toward the neutral position strongly.

The speed changing operation of the HST mechanism 25 is allowed to be slow in some degree. On the contrary, for the steering operation of the HST mechanism 28 requiring a sufficiently sharp activity, the steering servo rod 112 and the steering operation arm 162 are connected through a circular hole and a connecting pin 162b.

Regarding to this, in the operation system for the steering wheel 19, a necessary clearance is spaced between the neutral index plate 123 under the steering wheel 19 and the other end portion (provided with the long hole 125a and others) of the steering detecting link 125 connected with the neutral index plate 123.

Due to the above mentioned construction according to the present invention, the selection between advancing and reversing and the speed changing of the driving crawlers 2 are naturally operated by the operation of the speed changing lever 68 and the left and right driving crawlers 2 are operated individually by the rotation of the steering wheel 19.

Figure 25:
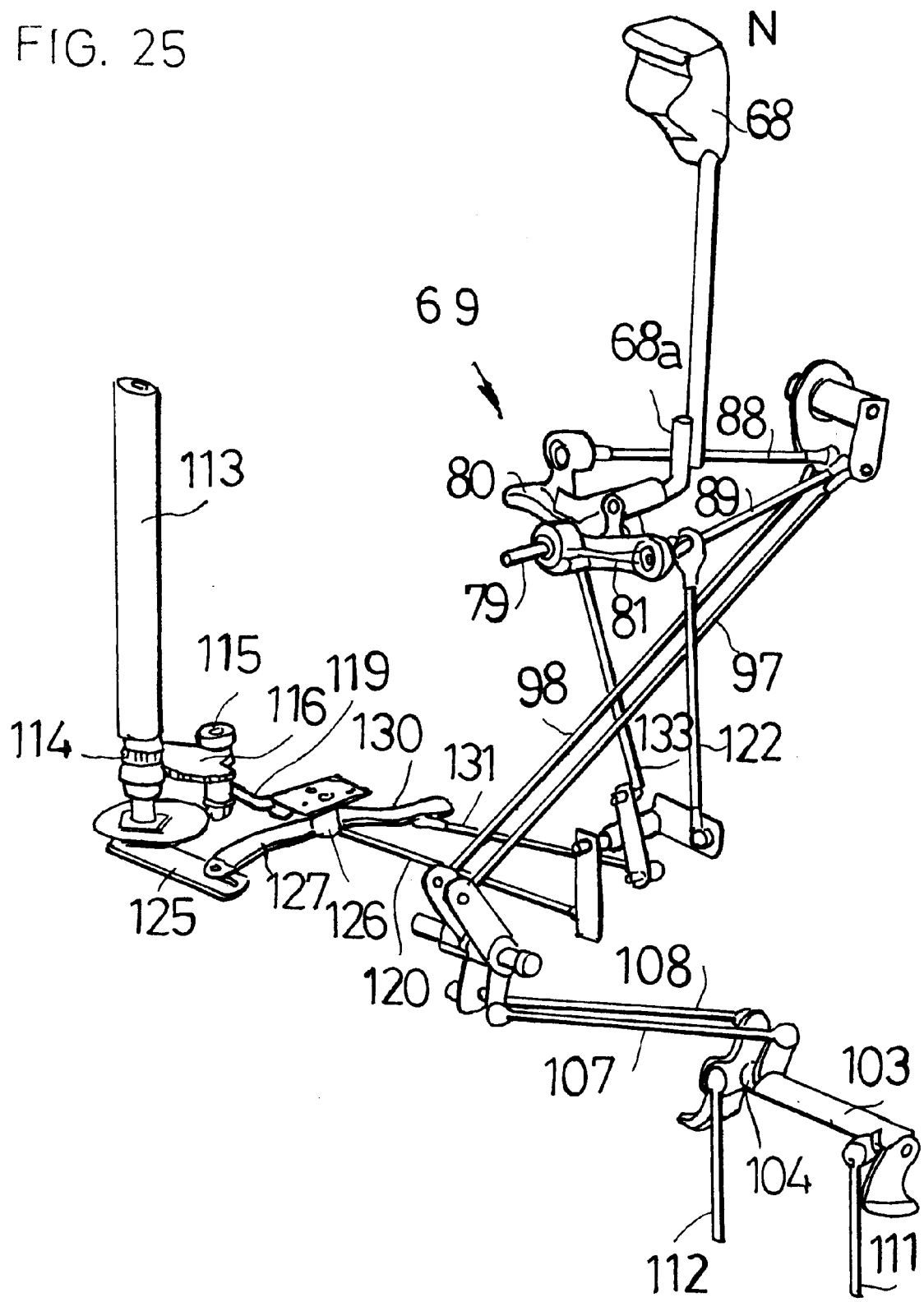
FIG. 25 is a perspective view of the linkage when both of the operation angles of the speed changing lever 68 and the steering wheel 19 are 0-degree.

In the case shown in FIG. 25, the speed changing lever 68 is set in the neutral position N and the steering wheel 19 is directed for straight travelling.

In this condition, the main speed changing mechanism is neutral, so that, even if the steering wheel 19 is rotated for turning, the joint shaft 89 moves on the surface of the cone centering the longitudinally horizontal line L1, thereby making the distance between the joint portions 89a and 89b constant. Accordingly, the steering hydraulic motor 27 of the HST mechanism 28 is not rotated.

Accordingly, when the speed changing lever 68 is set in the neutral position, even if the steering wheel 19 is wrongly operated, the crawlers 2 driven by the HST mechanism 28 can be prevented from staring rotating to spin.

Figure 26:
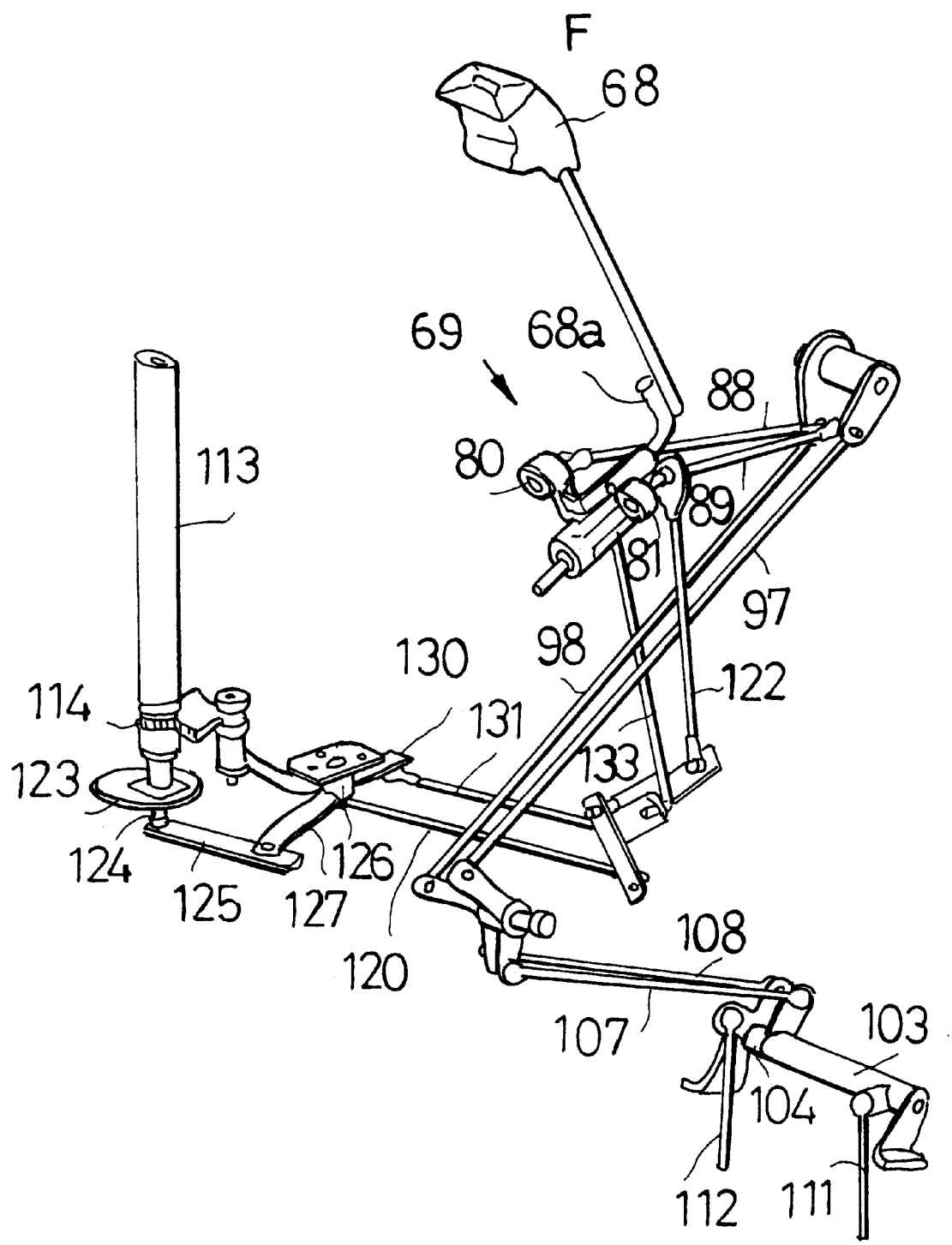
FIG. 26 is a perspective view of the same when the speed changing lever 68 is operated for advancing at a 30-degree angle and the steering wheel 19 is leftwardly operated at a 135-degree angle.

Referring to FIG. 26, the speed changing lever 68 rotated from the position shown in FIG. 25 reaches a position F of the maximum angle of 30-degree for advancing, and the steering wheel 19 rotated from the position shown in FIG. 25 reaches the position of the maximum angle of 135-degree for leftward turning. In this situation such that the steering wheel 19 is operated at a large angle for turning on a small circle, if a vehicle is running too fast, the vehicle rolls sideways or an operator is tossed off. Then, the travelling speed set by the speed changing lever 68 is gradually reduced in proportion to the increase of the rotational degree of the steering wheel 19, so that, at the max operation angle of 135-degree of the steering wheel 19, the speed reduction becomes the most.

Figure 27:
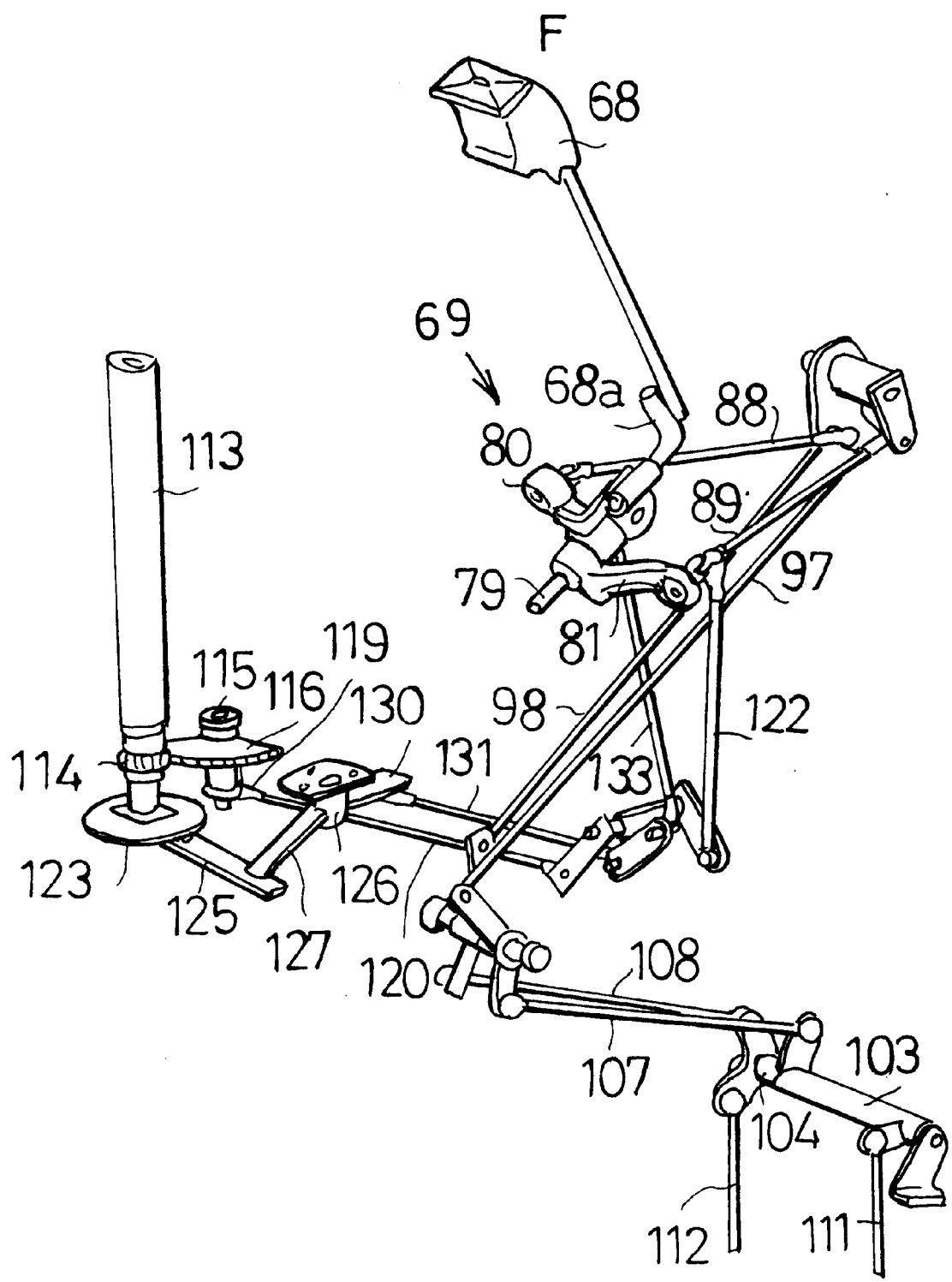
FIG. 27 is a perspective view of the same when the speed changing lever 68 is operated for advancing at a 30-degree angle and the steering wheel 19 is rightwardly operated at a 135-degree angle.

Referring to FIG. 27, the speed changing lever 68 is set on the advancing high speed position F, and the steering wheel 19 is fully rotated rightwardly at an angle of 135-degree so as to make the vehicle turn rightwardly on the smallest circle. In this case, the sector gear 116 detects the steering wheel 19, the universal joint type steering first and second rods 120 and 122 make the universal joint shaft 89 and the operation arm 85 act, thereby accelerating the steering HST mechanism 28 to the maximum degree.

In comparison between both situations of the steering operation arm 81 shown in FIGS. 26 and 27, their rotational directions are vertically opposite to each other, however, both their rotational degrees are the maximum, similarly.

Figure 28:
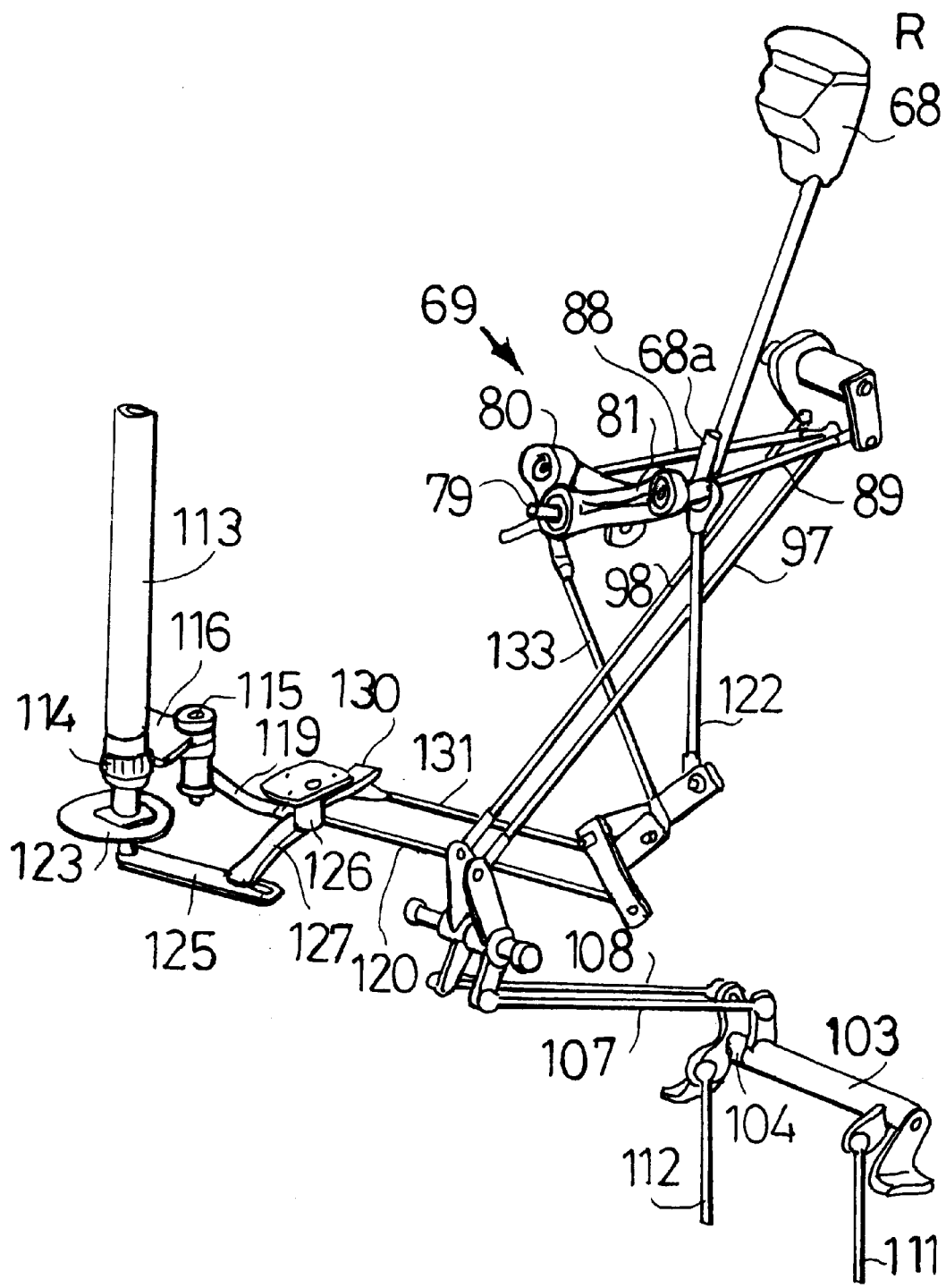
FIG. 28 is a perspective view of the same when the speed changing lever 68 is operated for reversing at a 25-degree angle and the steering wheel 19 is leftwardly operated at a 135-degree angle.
Figure 29:
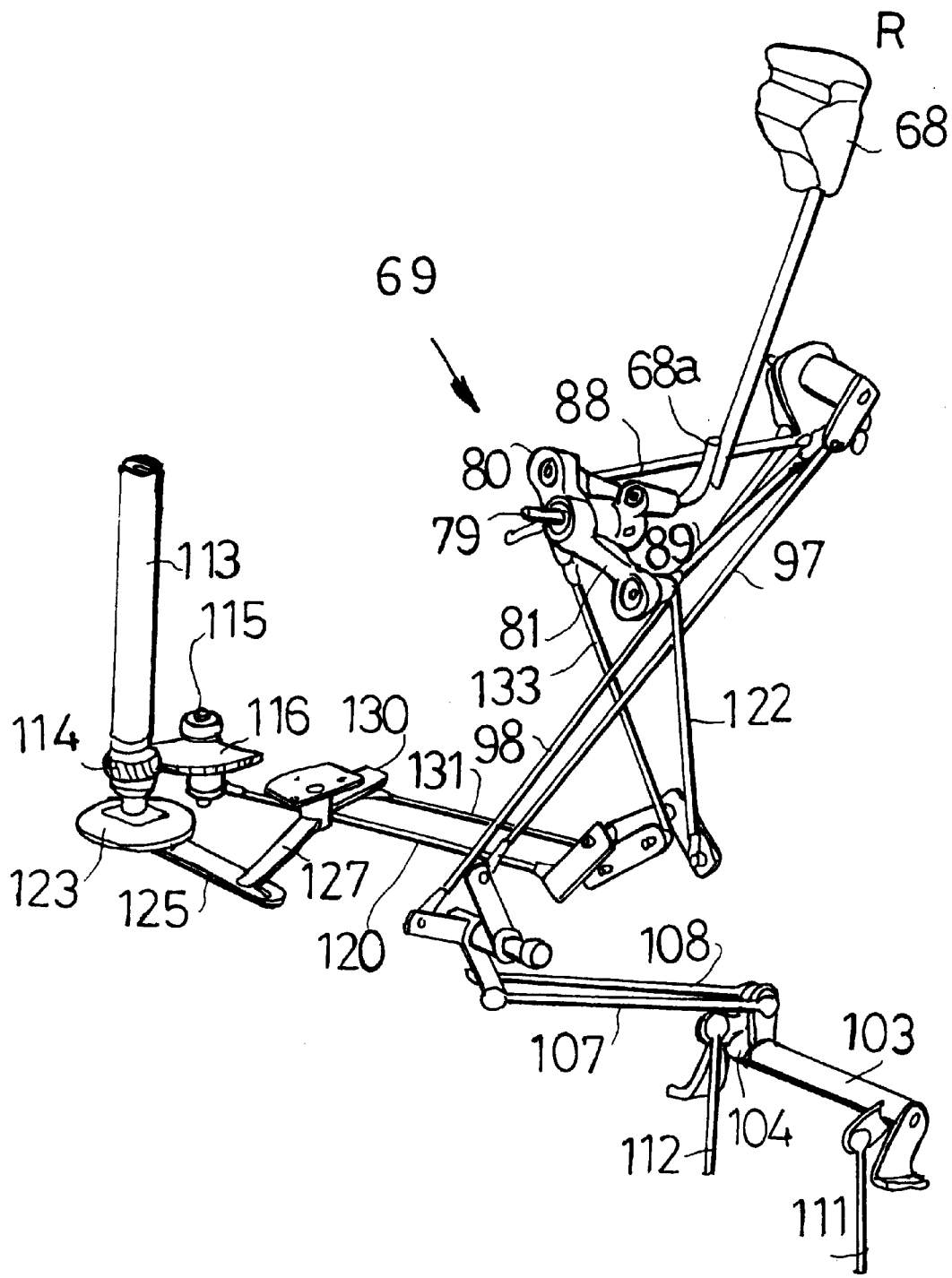
FIG. 29 is a perspective view of the same when the speed changing lever 68 is operated for reversing at a 25-degree angle and the steering wheel 19 is rightwardly operated at a 135-degree angle.

Referring to FIGS. 28 and 29, the speed changing lever 68 reaches a position R of the maximum angle of 25-degree for high-speed reversing, and the steering wheel 19 is rotated at the maximum angle of 135-degree.

In the both cases, the steering operation member 81 is rotated at the maximum angle while being directed in vertically opposite to each other.

In any situation of those shown in FIGS. 26 through 28, the driving HST mechanism 25 is operated at the maximum speed position in advancing or reversing by the rotation of the speed changing lever 68 through the universal joint shaft 88.

In this condition, the universal joint shaft 88 is additionally operated by the steering wheel 19 through the steering detecting link 125, the first swing arm 127, the second swing arm 130, the universal type first speed reduction rod 131 and second speed reduction rod 133.

Accordingly, the speed determined by the speed changing lever 68 is reduced, or partly increased in correspondence to the rotational angle of the steering wheel 19.

In this regard, the sector gear 116 engaging with the gear 114 of the steering wheel operation shaft 113 downwardly extending from the steering wheel 19 is rotated so as to rotate the steering operation member 81 centering the second pivotal shaft 79 through the universal joint type steering first rod 120 and the universal joint type steering second rod 122, so that the universal joint shaft 89 is pulled so as to be shortened, thereby operating the operation arm 85 so as to increase the speed ratio between the left and right driving crawlers 2.

When the steering wheel 19 is operated for rightward turning, the rotational direction of the sector gear 116 is opposite and the universal joint type steering first rod 120 and the universal joint type steering second rod 122 are pushed so as to push the steering operation member 81 to rotate upwardly, thereby shortening the universal joint shaft 89. Hence, the rotary speed of the steering HST mechanism 28 is increased similarly, so that the rotational speed ratio between the left and right driving crawlers 2 is increased.

Additionally, the mechanism to detect the rotational degree of the steering wheel 19 for decelerating operation of the driving HST mechanism 25 is provided as shown in FIGS. 14 and 15.

In this regard, the steering detecting link 125 is pivoted onto the neutral index plate 123 fixed to the steering wheel operation shaft 113 of the steering wheel 19, through the projecting shaft 124.

As shown in FIG. 14, the steering detecting link 125 is pivoted in the condition that the projecting shaft 124 is disposed at just right side of the neutral index plate 123 when the steering wheel 19 stays the straight driving position.

Additionally, whether the steering wheel 19 is rotated from the position leftwardly or rightwardly, the projecting shaft 124 moves forward and backward peripherally and tangentially. In the slight rotational degree of the steering wheel 19, the motional degree of the steering detecting link 125 is not so large in comparison with the rotational angle of the steering wheel 19, so that the steering HST mechanism 28 gradually starts rotating.

When the steering wheel 19 is further rotated beyond the early rotation thereof, the projecting shaft 124 is disposed in either front or rear of the gear 114, so that the motional degree of the steering detecting link 125 becomes larger in proportion to the rotational angle thereof. Referring to FIG. 19, the steering wheel 19 is rotated at the maximum angle of 135-degree. In this situation, the steering detecting link 125 moves greatly leftward.

Thus, when the rotation angle of the steering wheel 19 becomes large, the second speed reduction rod 133 is pushed or pulled by the motion of the steering detecting link 125 through the first swing arm 127, the second swing arm 130 and the universal joint type first swing rod 131, so that the speed changing operation member 80 shown in FIG. 20 is rotated so as to push or pull the universal joint shaft 88 for the non-stage speed changing operation of the steering HST mechanism 28.

As a result, the increase rate of the rotary speed of the steering HST mechanism 28 operated by the steering wheel 19 is small at first, and when the steering wheel 19 is rotated in some degree, it becomes large.

Figure 30:
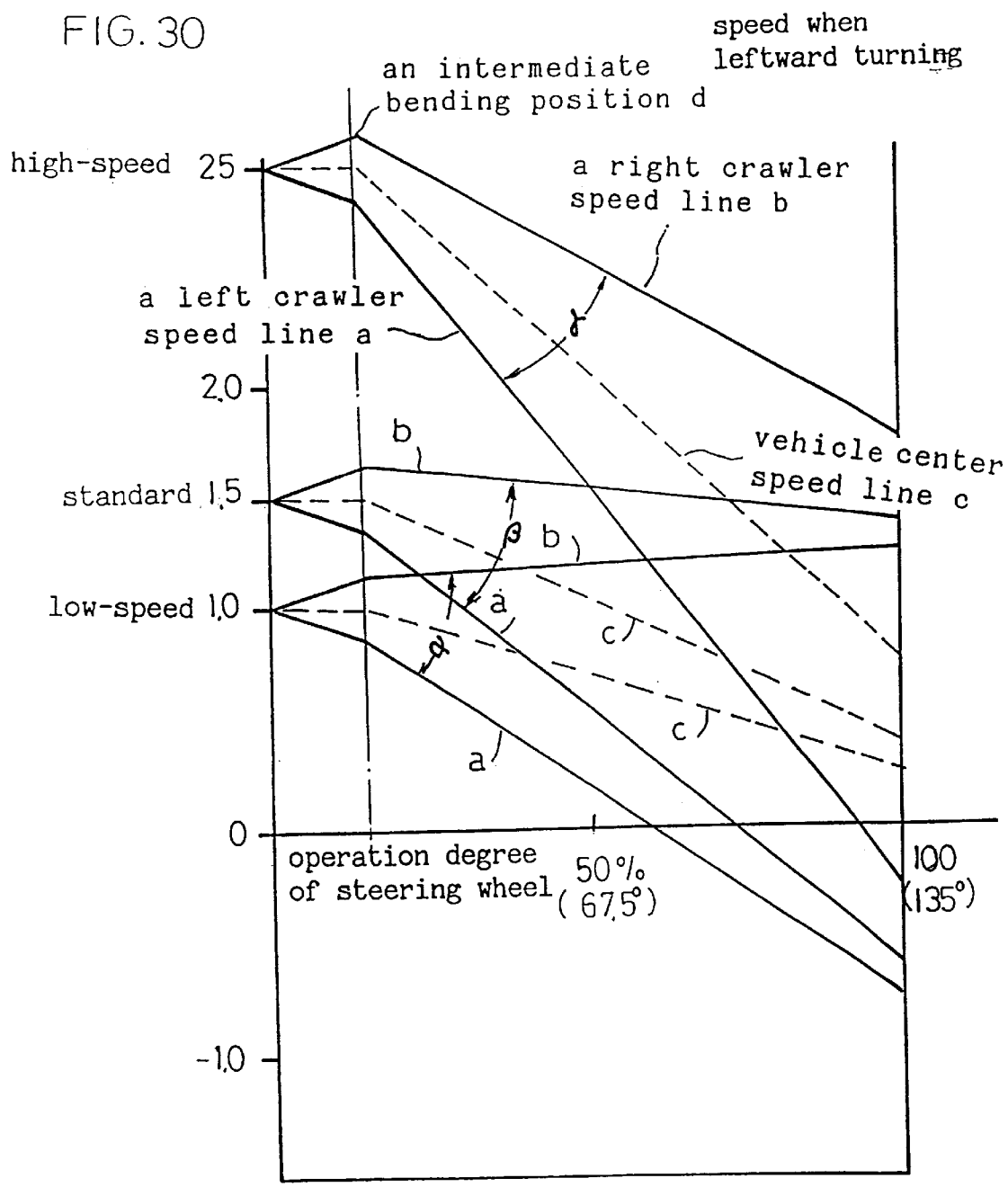
FIG. 30 is a graph of speed variation in relation to the operations of the speed changing lever 68 and the steering wheel 19 during leftward turning. During rightward turning, the laterally inverse view of FIG. 30 is used.

The graph shown in FIG. 30 describes the variation of the difference between left and right speeds according to the operation of the steering wheel 19 and the reduction of travelling speed according to the same.

In this regard, a vehicle center speed line c designates that the speed of the driving HST mechanism 25 is reduced as the rotational angle of the steering wheel 19 is increased through the operation of the steering detecting link 125.

Furthermore, as shown in FIG. 30, the angle between a left crawler speed line a and a right crawler speed line b looks open-wide, so that the larger the rotational angle of the steering wheel 19, the larger the difference of speed between the left and right crawlers becomes. It means that the sector gear 116 is rotated by the steering wheel 19 so as to accelerate the steering HST mechanism 28 gradually through the universal joint shaft 89.

As shown in FIG. 30, the left crawler speed line a and the right crawler speed line b bend at the intermediate thereof. However, the angle between the lines a and b does not change whether the rotational angle of the steering wheel 19 is small or large.

In relation to the positions of the neutral index plate 123, the projecting shaft 124 and the steering detecting link 125, the vehicle center speed line c bends at an intermediate bending position d, so that the speed reduction rate corresponding to the rotational angle of the steering wheel 19 changes, whereby the left crawler speed line a and the right crawler speed line b do not change their angle between but only bend at their intermediate positions.

According to the present invention as the above mentioned, the driving HST mechanism 25, which is operated by the speed changing lever 68, and the steering HST mechanism 28, which is operated by the steering wheel 19, are juxtaposed so as to constitute the HST apparatus whose operating mechanism is so constructed that the speed ratio between the left and right driving device is changed in correspondence to the rotational operation angle of the steering wheel 19. This is operationally designated by the gradually open-wide angle between the left crawler speed line a and the right crawler speed line b.

Also, the driving HST mechanism 25, which is operated by the speed changing lever 68, and the steering HST mechanism 28, which is operated by the steering wheel 19, are juxtaposed so as to constitute the HST apparatus whose operating mechanism is so constructed that the angle between the left crawler speed line a and the right crawler speed line b varies from a small degree α to a large degree γ through a middle degree β as the speed changing lever 68 is rotationally operated from a low speed position to a high speed position through a standard speed position. It means that, while the steering wheel 19 is in the same position, the turning circle is changed according to the change of the operational position of the speed changing lever 68, or in other words, the vehicle turns on a large circle by reduction of the speed difference for steering during high-speed travelling and turns on a small circle by increasing the lateral speed difference during low-speed travelling.

Furthermore, when the speed level determined by the speed changing lever 68 is low, the driving device on the turning side is gradually decelerated and the other driving device on the opposite side is gradually accelerated. When the speed level determined by the speed changing lever 68 is high, both the driving devices on the turning and opposite sides are gradually decelerated, however, the speed reduction rate of the turning side is larger.

This operation is designated by the angles of inclinations of the straight lines of the left crawler speed line a and the right crawler speed line b as shown in FIG. 30. Whichever the determined speed level is low or high, as the rotational angle of the steering wheel 19 is increased, the rotation on the turning side is gradually decelerated to stop, and then starts being accelerated in the opposite direction.

In a low-speed setting, the difference of speed can be larger. In a high-speed setting, the difference cannot be extremely large.

Moreover, when the rotational angle of the steering wheel 19 is small, the speed reducing rate of the decelerated side is small and the speed increasing rate of the accelerated side large. When the angle is large, the speed reducing rate of the decelerated side is large and the speed increasing rate of the accelerated side small. These are designated by that the vehicle center speed line c bends at the intermediate thereof in a small operation degree of the steering wheel 19 as shown in FIG. 30. Accordingly, when the operation degree of the steering wheel 19 is small, the driving HST mechanism 25 is prevented from being excessively operated for deceleration.

When the speed level determined by the speed changing lever 68 is high, both the turning and opposite sides are gradually decelerated, however, the opposite side is once accelerated, and then gradually decelerated. This is designated by that, whether the determined speed level is low or high, the right crawler speed line b serving as the opposite side speed is upwardly inclined before (at the left of) the bending point d, in other words, when the operational degree of the steering wheel 19 is small, and afterward, or when the steering wheel 19 is further operated, it is downwardly inclined.

POSSIBILITY OF INDUSTRIAL USE

The steering mechanism of a driving transmission apparatus according to the present invention is useful to a crawler type working vehicle like a combine, wherein speed changing is operated by a speed changing lever and steering is operated by a round steering wheel.

What is claimed is:

1. A steering mechanism of a driving transmission apparatus, said driving transmission apparatus transmitting an output power of an engine to left and right crawler-type driving devices through a speed changing mechanism and a differential mechanism, comprising:

a steering HST provided on said driving transmission apparatus, wherein the rotational difference between said left and right crawler-type driving devices is increased through said differential mechanism in proportion to the output of said steering HST, and a steering operation means provided on an operation portion of a vehicle, wherein, as the operation degree of said steering operation means is increased, the output rotary speed of said steering HST is increased and the output rotary speed of said speed changing mechanism is reduced and wherein, when said speed changing mechanism is set in a substantially median speed range, as the operation degree of said steering operation means is increased, a turning side one of said left and right crawler-type driving devices is decelerated and the opposite side one is kept at a substantially constant speed.

2. A steering mechanism of a driving transmission apparatus as set forth in claim 1, wherein as the operation degree of said steering operation means is increased, a turning side one of said left and right crawler-type driving devices is decelerated regardless of the speed level determined by said speed changing mechanism, and the opposite side one is accelerated when said speed changing mechanism determines a high speed level, and is decelerated when said speed changing mechanism determines a low speed level.

3. A steering mechanism of a driving transmission apparatus as set forth in claim 1, wherein said output rotary speed of said speed changing mechanism does not change when the operation degree of said steering operation means is within a predetermined range from the straight driving position, and is decelerated when the same operation degree is beyond said predetermined range.

4. A steering mechanism of a driving transmission apparatus, said driving transmission apparatus transmitting an output power of an engine to left and right crawler-type driving devices through a speed changing mechanism and a differential mechanism, comprising:

a steering HST provided on said driving transmission apparatus, wherein the rotational difference between said left and right crawler-type driving devices is increased through said differential mechanism in proportion to the output of said steering HST, and a steering operation means provided on an operation portion of a vehicle, wherein, as the operation degree of said steering operation means is increased, the output rotary speed of said steering HST is increased and the output rotary speed of said speed changing mechanism is reduced and wherein, said output rotary speed of said speed changing mechanism does not change when the operation degree of said steering operation means is within a predetermined range from the straight driving position, and is decelerated when the same operation degree is beyond said predetermined range.

5. A steering mechanism of a driving transmission apparatus as set forth in claim 4, wherein, when said steering operation means is within said predetermined operation range, a turning side one of said left and right crawler-type driving devices is decelerated and the opposite side one is accelerated in substantially the same degree with the deceleration of said turning one.

6. A steering mechanism of a driving transmission apparatus as set forth in claim 4, further comprising:

a linkage interlocking said steering operation means with respective output setting means of said steering HST and said speed changing mechanism, wherein a dead zone of said linkage is formed in correspondence to said predetermined operation range of said steering operation means.

7. A steering mechanism of a driving transmission apparatus as set forth in claim 5, further comprising:

a linkage interlocking said steering operation means with respective output setting means of said steering HST and said speed changing mechanism, wherein a dead zone of said linkage is formed in correspondence to said predetermined operation range of said steering operation means.

8. A steering mechanism of a driving transmission apparatus, said driving transmission apparatus transmitting an output power of an engine to left and right crawler-type driving devices through a speed changing mechanism and a differential mechanism, comprising:

a speed changing operation means provided on an operation portion of a vehicle for changing the output of said speed changing mechanism;

a steering HST provided on said driving transmission apparatus, wherein the rotational difference between said left and right crawler-type driving devices is increased through said differential mechanism in proportion to the output of said steering HST, and a steering operation means provided on said operation portion of a vehicle for changing the output of said steering HST, wherein, when the speed level determined by said speed changing operation means is high, a turning side one of said left and right crawler-type driving devices is decelerated at a small rate as said steering operation means is operated for turning from the straight driving position within a predetermined range, and is decelerated at a large rate as said steering operation means is further operated beyond said predetermined range, and the other opposite side one of said left and right crawler-type driving devices is accelerated as said steering operation means is operated for turning from the straight driving position within said predetermined range, and is decelerated as said steering operation means is further operated beyond said predetermined range.

* * * * *